United States Patent [19]

McCallister et al.

[11] Patent Number: 4,922,506

[45] Date of Patent: May 1, 1990

[54] COMPENSATING FOR DISTORTION IN A COMMUNICATION CHANNEL

[75] Inventors: Ronald D. McCallister; Daniel D. Shearer, III, both of Scottsdale, Ariz.

[73] Assignee: Sicom Corporation, Scottsdale, Ariz.

[21] Appl. No.: 142,707

[22] Filed: Jan. 11, 1988

[51] Int. Cl.$^5$ ............. H04B 15/00; G06F 15/34
[52] U.S. Cl. .................................. 375/1; 324/639; 364/724.01; 364/802
[58] Field of Search ............ 375/1; 380/34; 324/57, 324/58.5 A; 364/553, 554, 802, 485, 724.02, 724.01

[56] References Cited

U.S. PATENT DOCUMENTS

| | | | |
|---|---|---|---|
| 3,988,667 | 10/1976 | Roth et al. | 364/485 |
| 4,058,713 | 11/1977 | DiToro | 364/724.02 |
| 4,279,019 | 7/1981 | Heyser | 364/553 |
| 4,361,891 | 11/1982 | Lobenstein et al. | 375/1 |
| 4,365,338 | 12/1982 | McRae et al. | 375/1 |
| 4,394,744 | 7/1983 | Wrench, Jr. | 364/553 |
| 4,462,081 | 7/1984 | Lehan | 364/554 |
| 4,611,333 | 9/1986 | McCallister et al. | 375/1 |
| 4,621,365 | 11/1986 | Chiu | 375/1 |
| 4,654,808 | 3/1987 | Potter et al. | 364/553 |
| 4,713,782 | 12/1987 | Blackham | 364/553 |
| 4,774,715 | 9/1988 | Messenger | 375/1 |
| 4,807,256 | 2/1989 | Holmes et al. | 375/1 |

OTHER PUBLICATIONS

Hewlett Packard Signal Analyzer Model 3582A (1983).

*Primary Examiner*—Salvatore Gangialosi
*Attorney, Agent, or Firm*—Harry M. Weiss

[57] ABSTRACT

This disclosure relates to a technique for estimating the characteristics of a propagation channel by processing a cyclostationary signal which has passed through it. The technique extends to the use of this estimate to reduce the impact of the channel distortion on the recovered signal. Unique features of this technique include its ability to function even when strong interference is present with the cyclostationary signal of interest.

63 Claims, 7 Drawing Sheets

COMPENSATING FOR DISTORTION IN A COMMUNICATION CHANNEL

BACKGROUND OF THE INVENTION

1. Field of Invention

This invention relates generally to a method and apparatus for the processing of a signal having cyclostationary properties and, more particularly, to a method and apparatus for estimating the transfer characteristics of a medium from the output of the medium and using the estimated transfer characteristics to improve the signal to noise ratio of a recovered cyclostationary signal.

2. Description of the Prior Art

Since World War II, there has been an increasing interest in propagation of a signal with a direct sequence spread baseband spectrum. The increasing interest persists because at any given level of radiation, spreading causes a reduced power density over the spread spectrum. Additionally, encryption is almost inherent in the spreading. Because of the reduced power density and the encryption, a multiplicity of sources may simultaneously radiate at frequencies within the spread spectrum without interfering at a receiving station. Since the multiplicity of sources may simultaneously radiate without interfering, the spread spectrum may be used to achieve what is referred to in the art as code division multiple access.

More particularly, the spread spectrum may be produced by modulating an unspread baseband signal with the output of a spread spectrum sequence generator. Typically, the sequence generator generates a spreading signal having a level representative of either one or minus one at any given time. The spreading signal is most often referred to as a sequence of chips, each chip consisting of a period during which the spreading signal is of either a positive (one) or negative (minus one) polarity. It should be understood that the sequence is cyclically generated.

The rate at which the chips are provided is known as the chip or clock rate. Additionally, the sequence has a defined pattern, known as the spread sequence. The defined pattern is the encryption referred to hereinbefore.

The modulation of the unspread baseband signal provides a spread signal having an amplitude which is the product of the level of the spreading signal and the amplitude of the baseband signal. The spread signal has an increased spectral width that substantially equals the spectral width of the spreading signal.

Since all of the chips have substantially identical pulse shapes, the spread signal has statistical characteristics that vary cyclically. Hence, the spread signal is referred to in the art as a cyclostationary signal.

It should be understood that a signal, substantially the same as the unspread baseband signal, is recovered by modulating the spread signal with a local spreading signal provided by a local spread sequence signal generator at the receiving station. The output of the local sequence generator must be synchronized to the received signal to accomplish the recovery.

The baseband signal may be an audio signal, the output of a Phase Shift Keyed (PSK) generator, a light signal, or the output of any of a plethora of generators used to provide signals for propagation through a medium. Moreover, the medium may be the atmosphere, the earth, a glass fiber or any other medium.

Transmission through the medium may cause distortion of the spread signal. The distortion manifests itself as a degradation of the signal to noise ratio of the recovered baseband signal. It is well known that the degradation is reduced by appropriately modifying the local spreading signal.

An appropriately modified local spreading signal is obtained by altering the local spreading signal in accordance with the transfer characteristics of the medium. However, the transfer characteristics may be unknown and may be subject to temporal changes. It is desirable to determine the transfer characteristics from the output of the medium, and use it to improve the signal to noise ratio of the recovered baseband signal. This invention covers those spread and unspread signals which are included or encompassed by the term cyclostationery signals.

SUMMARY OF THE INVENTION

An object of the present invention is an improved apparatus for providing a recovered baseband signal.

Another object of the present invention is an improved method for providing a recovered baseband signal.

Yet another object of the present invention is to provide an improved method and apparatus to estimate the transfer characteristics of a propagation medium.

According to the present invention, a medium estimator generates a plurality of pairs of signals in response to a cyclostationery signal received through a propagation medium. One signal of each estimator pair is representative of a portion of an in-phase component of a correlation signal. The other signal of each estimator pair is representative of a portion of a quadrature component of the correlation signal. A computer utilizes a representation of an assumed set of values of coefficients in a model of the transfer characteristics of the medium. In one specific embodiment, the computer utilizes the implementation to generate pairs of correlation model signals that respectively correspond to the pairs of estimator signals. The representation of the coefficients is varied to reduce the difference between the correlation model signals and the corresponding pairs of estimator signals.

The invention provides an improved apparatus and method for estimating transfer characteristics of a medium from the output of the medium. The estimation is independent of spread sequence and carrier frequency. Moreover, the estimation does not utilize synchronization between a local spread sequence generator and the spread signal.

Other objects, features and advantages of the invention will be apparent from the following description of embodiments of the invention, as illustrated in the accompanying drawing.

DESCRIPTION OF THE EMBODIMENTS

A first of two embodiments is included herein to present the teachings of the invention without a confusing amount of detail. A concept germane to both embodiments is that of matched filtering. As shown in FIG. 1A, a data pulse source 10A provides data pulses of either positive or negative polarity. The polarity is in accordance with an encoding of information represented by the pulses.

The pulses are transmitted through a medium 14A that has a transfer function, $H(w)$. The output of medium 14A is provided to one of two inputs of an adder 16A. The other input of adder 16A is connected to a noise source 18A. Adder 16A provides a signal substantially equal to the sum of signals respectively applied to its inputs. Hence, at the output of adder 16A there is a signal that is corrupted by noise.

A matched filter 20A includes an equalizer network 22A that is connected to the output of adder 16A, whereby the signal at the output of adder 16A is applied to the input of matched filter 20A. Equalizer 22A has a transfer function represented by the term, $H^*(w)$ that is the complex conjugate of the transfer function of medium 14A.

The output of equalizer 22A is connected to an integrate and dump circuit 24A. During a pulse period, circuit 24A provides a signal representative of the average amplitude of a signal applied at its input. At the end of the pulse period, circuit 24A is made to provide an initial value signal representative of zero.

It should be understood that matched filter 20A provides an output having an enhanced signal to noise ratio. It should also be understood that when noise provided by source 18A is of sufficiently low amplitude, the transfer function, $H(w)$, may be accurately determined by measurements, thereby readily enabling construction of equalizer 22A. Conversely, when source 18A provides a high noise level, construction of equalizer 22A is difficult. The embodiments herein relate to construction of a matched filter for a cyclostationary signal.

Figure 1:
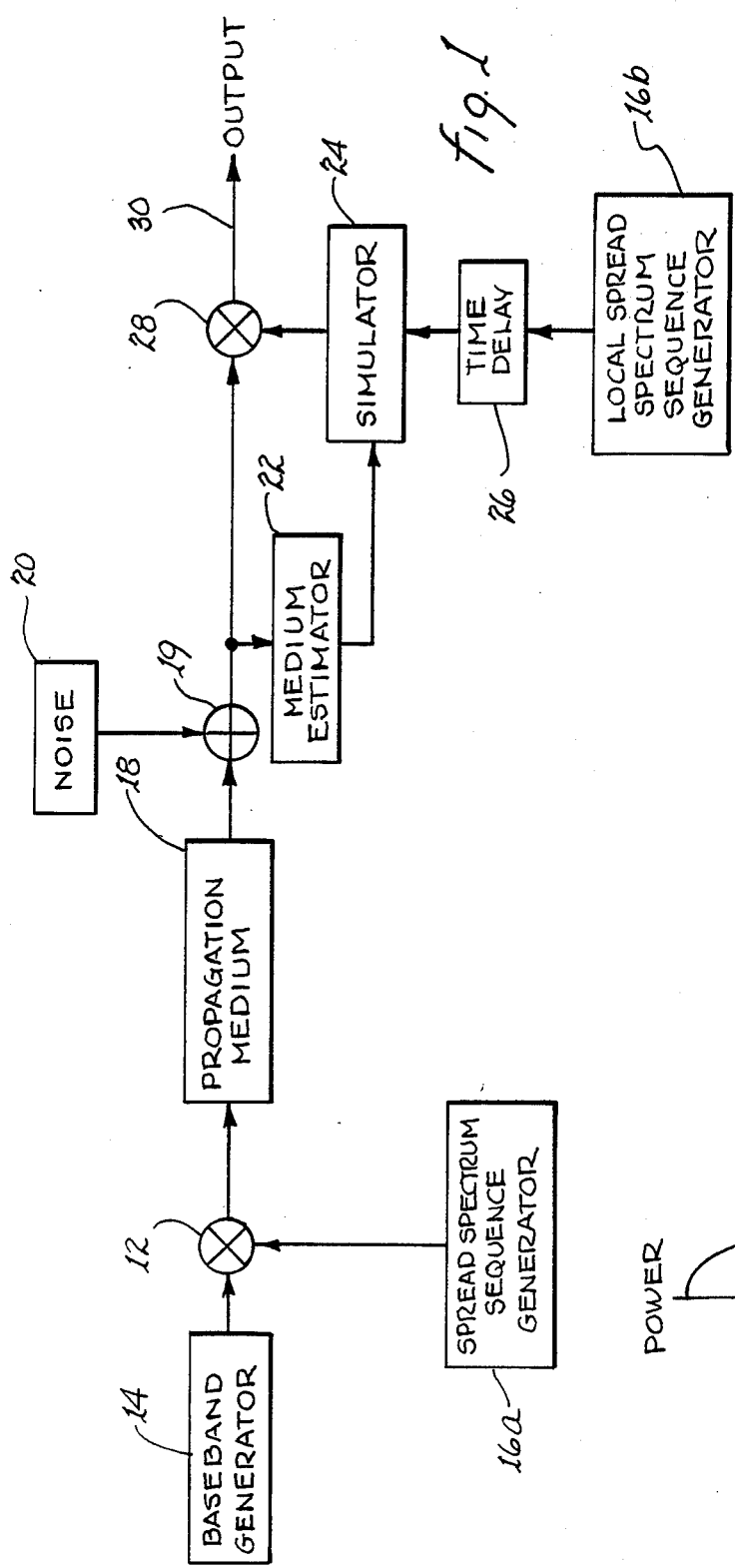
FIG. 1 is a block diagram of a first embodiment of the present invention.
Figure 1A:
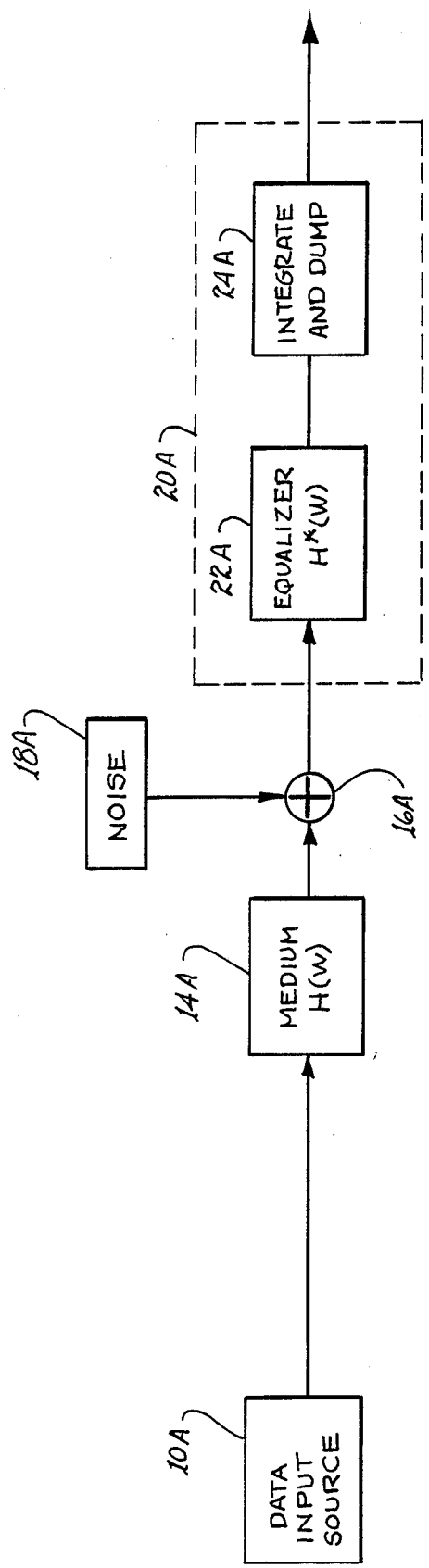
FIG. 1A is a block diagram of a communication channel that includes a matched filter.

As shown in FIG. 1, in the first embodiment, a multiplier circuit 12 has two inputs, one of which is connected to a baseband generator 14. As shown graphically in FIG. 2a, baseband generator 14 provides a signal having a baseband power density spectrum.

Figure 2:
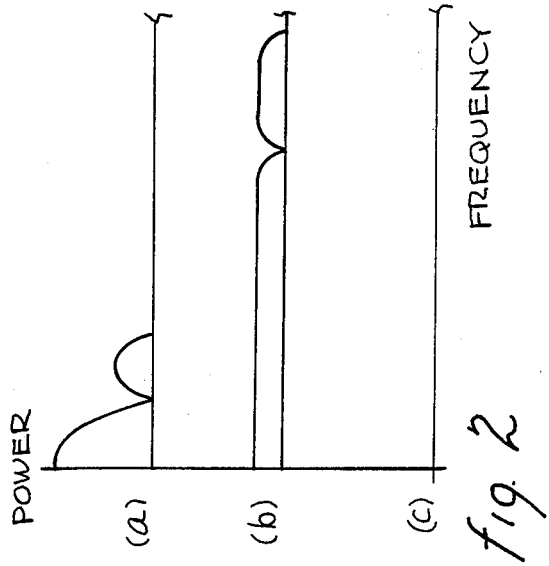
FIG. 2 is a graphical showing of power density spectra, all on the same frequency base, of signals provided in the embodiment of FIG. 1.

The other input of multiplier 12 is connected to the output of a reference spread spectrum sequence generator 16a (FIG. 1) that generates a spreading signal. Multiplier 12 is a well known type of circuit that provides a signal having an amplitude proportional to the product of two signals respectively applied to its inputs. Therefore, in response to the baseband signal and the spreading signal, multiplier 12 provides a signal having a spread baseband power density spectrum. A graphical representation of the spread spectrum is shown in FIG. 2b.

The output of multiplier 12 (FIG. 1) is coupled to a propagation medium 18. The output of medium 18 is coupled to one of two inputs of an adder 19. The other input of adder 19 is connected to a source of noise 20. Adder 19 is similar to adder 16A described in connection with FIG. 1A. Accordingly, at the output of adder 19, there is a propagated spread baseband signal that is corrupted by noise. The output of adder 19 is referred to hereinafter as a received signal. It should be understood that noise produced by source 20 may be atmospheric noise, receiver noise, or any other noise that is introduced in a communication channel.

The output of adder 19 is connected to a medium estimator 22. Medium estimator 22 generates correlation signals representative of components of the autocorrelation of the received signal. Medium estimator 22 is connected to one of two inputs of a simulator 24, whereby the correlation signals are provided to simulator 24. According to the present invention, simulator 24 utilizes only the correlation signals to generate a representation of coefficients in an equation of a model of the transfer characteristics of medium 18. In other words, the model is an estimate of the transfer characteristics of medium 18.

The other input of simulator 24 is coupled to a local spread sequence generator 16b through a time delay network 26. It should be understood that sequence generators 16a, 16b are synchronized to each other by apparatus that is not shown. The synchronization of sequence generators is well known in the art. Network 26 provides a delay for synchronizing the output of generator 16b to the received signal.

Unlike the matched filter of FIG. 1A that modifies the output of adder 16A (a received signal), simulator 24 modifies the output of generator 16b of FIG. 1. Because the output of generator 16b of FIG. 1 is modified, the transfer function, rather than its complex conjugate is utilized in this embodiment.

The output of adder 19 is connected to one of two inputs of a multiplier unit 28. The other input of multiplier 28 is connected to the output of simulator 24. Multiplier 28 is similar to multiplier 12 described hereinbefore. According to the present invention, simulator 24 has transfer characteristics similar to those of medium 18. Therefore, the output of simulator 24 is a modified local spreading signal that causes multiplier 28 to provide on an output signal line 30 a recovered baseband signal with an enhanced signal to noise ratio.

The present invention is predicated upon a Fourier transform relationship between a correlation of the output of medium 18 and the transfer function of medium 18. The transform relationship is given as:

$$C_n(\tau_K) = \frac{e^{-jW_m\tau_s}}{2\pi T} \int_{-\infty}^{\infty} P(w)P^*(w-w_n)H(w)H^*(w-w_n)e^{j(w-w_m)\tau_k} dw$$

where:

$C_n(\tau_k)$ is the autocorrelation of the output of medium 18, with a correlation delay, $\tau_k$;

n is an index of harmonics of the chip rate;

$w_n$ is the radian frequency of a harmonic of the chip rate;

w is radian frequency;

T is the spread period;

$\tau_s$ is a timing synchronization offset;

P(w) is the Fourier transform of a pulse provided by generator 16a; and

P*(w) is the complex conjugate of P(w)

H(w) is the transfer function of medium 18

H*(w) is the complex conjugate of H(w).

The term, $\tau_s$, is more fully explained hereinafter.

The transform relationship is a variation of a generalized equation in *Generalized Cross-Spectrum Symbol Synchronization* by R. McCallister, which is a doctoral thesis written in 1981 at Arizona State University. It should be understood that the transform relationship is that of a Fourier transform pair.

Figure 3:
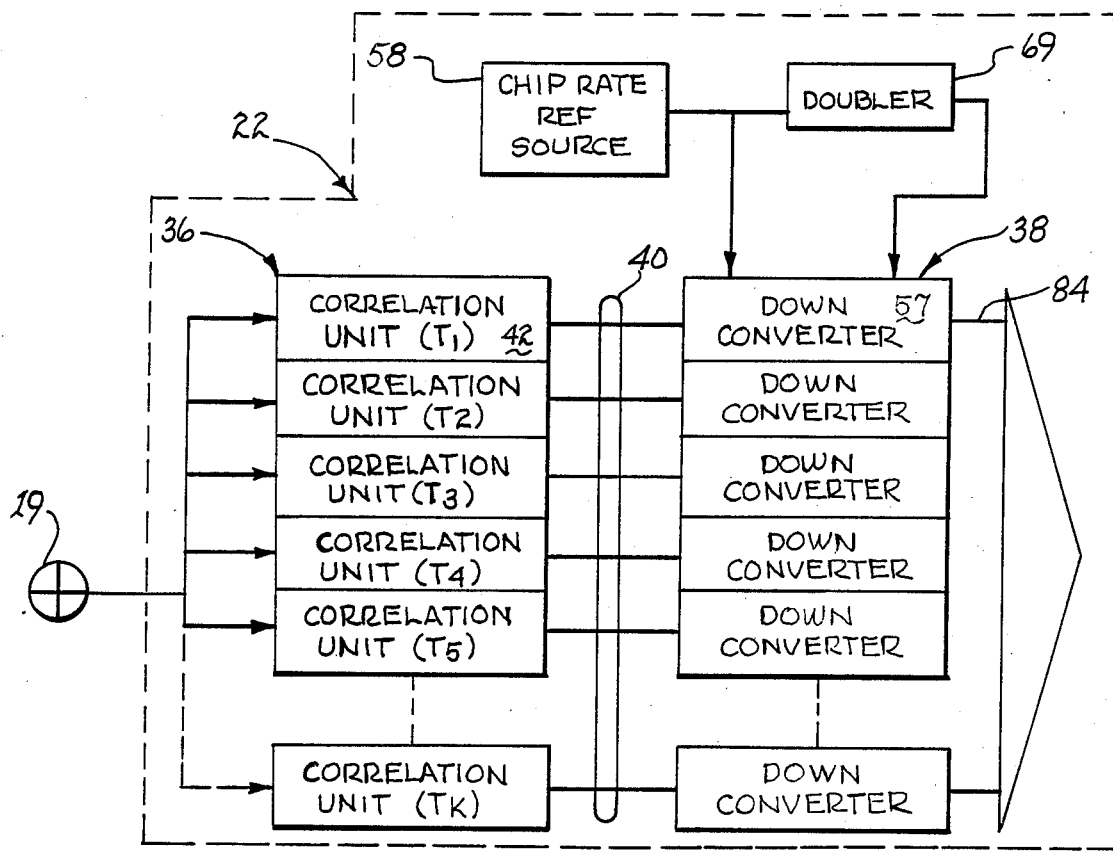
FIG. 3 is a block diagram of a medium estimator in the embodiment of FIG. 1.

As shown in FIG. 3, medium estimator 22 includes a plurality of correlation units 36 respectively connected to a plurality of down converters 38 through a plurality of signal lines 40. As explained hereinafter, each of converters 38 provide signals representative of two of the terms, $C_n(\tau_k)$ of the transform relationship, where:

n=1 for one of the two terms; and n=2 for the other term.

Although correlation units 36 are similar to each other, each includes a delay network with a unique value of delay, as explained hereinafter.

Figure 4:
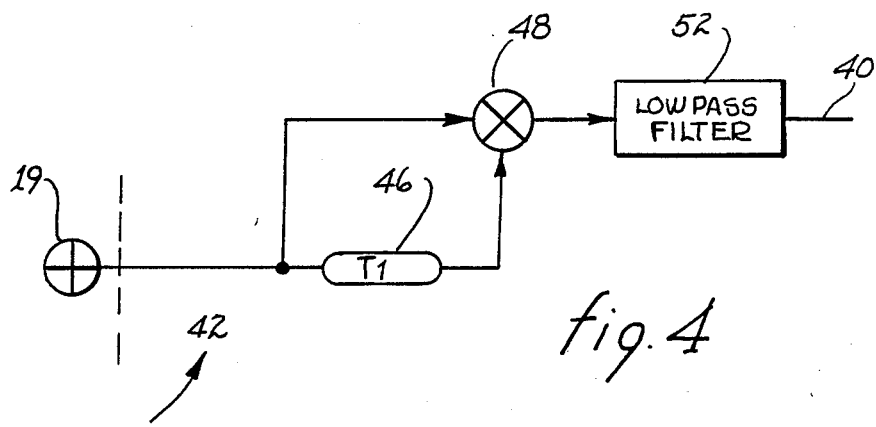
FIG. 4 is a block diagram of a correlator in the medium estimator of FIG. 3.

As shown in FIG. 4, a typical correlation unit 42 is comprised of a time delay network 46 that has its input connected to the output of adder 19. Additionally, a multiplier unit 48 has one of its two inputs connected to the output of adder 19. The other input of multiplier 48 is connected to the output of delay network 46.

Delay network 46 is a well known type of circuit that provides an output substantially the same as an input signal applied thereto, but delayed by a known time. Accordingly, the output of delay network 46 is a delayed received signal. Delay network 46 provides the correlation delay, $\tau_1$, for unit 42.

Multiplier 48 is similar to multiplier 12 described hereinbefore. The output of multiplier 48 has a component proportional to the autocorrelation of the received signal, with the correlation delay, $\tau_1$, and a noise component.

The noise component of the output of the multiplier 48 is spectrally diffuse, with power within a given noise bandwidth directly proportional to the noise bandwidth. Unlike the noise component, the $\tau_1$ correlation signal component is spectrally discrete, with power at harmonics of the chip rate. In other words, the power at any given harmonic is completely contained within any bandwidth about the given harmonic.

The output of multiplier 48 is connected to a low pass filter 52 at its input. Filter 52 provides the $\tau_1$ correlation signal, while eliminating much of the noise referred to hereinbefore.

Figure 5:
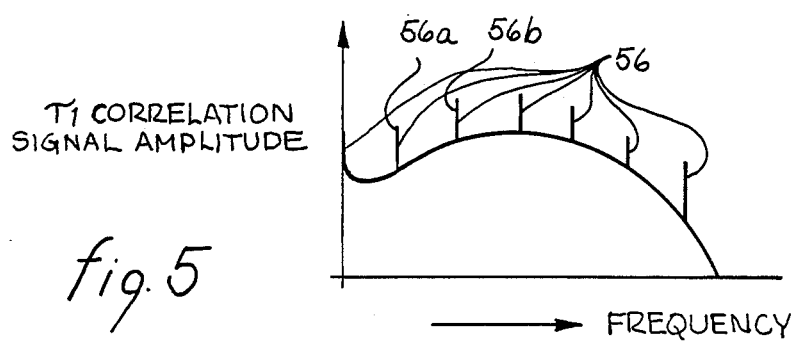
FIG. 5 is a graphical showing of an output of the correlator of FIG. 4.

As shown in FIG. 5, the $\tau_1$ correlation signal includes a group of signals 56, each at a frequency that is a harmonic of the chip rate. Signals 56a, 56b, for example, are at the fundamental and second harmonic, respectively, of the chip rate. Experimental results conclusively show that few of the harmonics need be utilized in estimating transfer characteristics of medium 18. In this embodiment, only the first and second harmonics are utilized.

Converters 38 are additionally connected to a chip rate reference source 58 that generates a sinusoidal signal having a frequency equal to the chip rate. The timing synchronization offset, $\tau_s$, referred to in connection with the transform relationship, is a timing difference between the fundamental frequency component of the spreading signal transmitted through medium 18 and the signal generated by source 58.

Source 58 is connected to the input of a frequency doubler 69. The output of doubler 69 is connected to converters 38. Doubler 69 generates a sinusoidal signal having a frequency of twice the chip rate. Frequency doublers are well known in the art.

Figure 6:
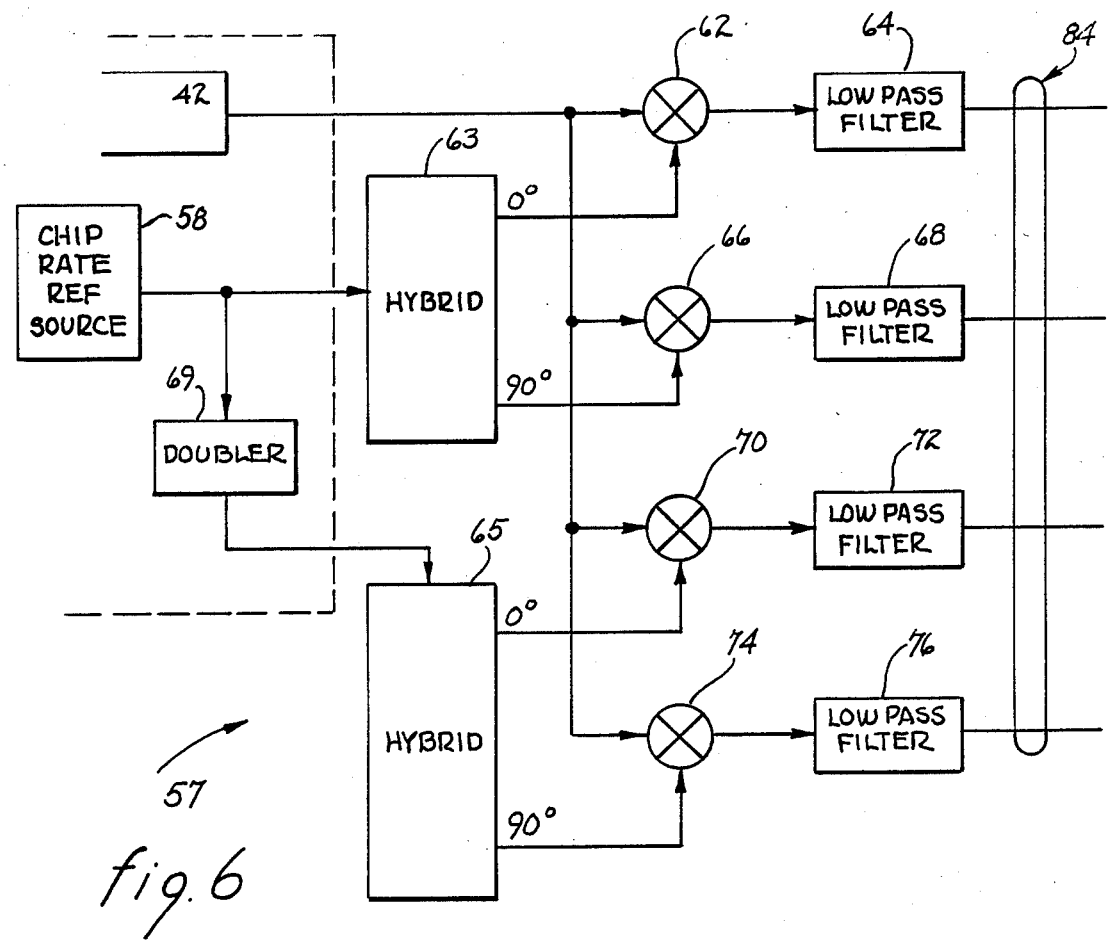
FIG. 6 is a block diagram of a down converter in the medium estimator of FIG. 3.

As shown in FIG. 6, converters 38 include a typical converter 57 which is similar to all others of converters 38. Converter 57 includes a hybrid 63 that has its input connected to source 58. Hybrid 63 is a well known type of network that has an output that provides an in-phase (zero degree) output signal, substantially the same as a signal applied at its input. Hybrid 63 additionally has an output that provides a quadrature output signal that is phase shifted by ninety degrees.

The in-phase output of hybrid 63 is connected to a multiplier unit 62 at one of two inputs thereof. The other input of multiplier 62 is connected to the output of unit 42, whereby the $\tau_1$ correlation signal is applied to multiplier 62. Multiplier 62 is similar to multiplier 12 described hereinbefore.

Because the frequency of the output of source 58 equals the chip rate, multiplier 62 down converts an in-phase component of the $\tau_1$ correlation signal to provide a DC voltage, referred to as a first harmonic $\tau_1$ in-phase estimator signal, and noise. first harmonic $\tau_1$ in-phase estimator signal is represented by the term, $Re\{C_1(\tau_1)\}$.

The output of multiplier 62 is connected to a low pass filter 64 at its input. Filter 64 rejects the noise produced by multiplier 62.

The output of unit 42 is additionally connected to a multiplier unit 66 at one of two inputs thereof whereby the correlation signal is applied to multiplier 66. Multiplier 66 is similar to multiplier 12 described hereinbefore. The other input of multiplier 66 is connected to the quadrature output of hybrid 63. For reasons analogous to those stated in connection with the in-phase estimator signal, multiplier 66 down converts a quadrature component of the correlation signal to provide a DC voltage, referred to as a first harmonic $\tau_1$ quadrature estimator signal, and noise. The first harmonic $\tau_1$ quadrature estimator signal is represented by the term, $Im\{C_1(\tau_1)\}$.

The output of multiplier 66 is connected to a low pass filter 68 at its input. Filter 68, similar to filter 64, rejects the noise produced by multiplier 66.

The output of doubler 69 is connected to a hybrid 65 at its input. Hybrid 65 is similar to hybrid 63 described hereinbefore. The in-phase output of hybrid 65 is connected to one of two inputs of a multiplier unit 70. The other input of multiplier 70 is connected to the output of unit 42 whereby the correlation signal is applied to multiplier 70. Multiplier 70 is similar to multiplier 12 described hereinbefore.

The output of multiplier 70 is connected to a low pass filter 72 at its input. For reasons corresponding to those given in connection with filter 64, filter 72 provides a substantially noise-free, second harmonic $\tau_1$ in-phase estimator signal represented by the term $Re\{C_2(\tau_1)\}$.

The quadrature output of hybrid 65 is connected to a multiplier unit 74 at one of two inputs thereof. The other input of multiplier 74 is connected to the output of unit 42 whereby the $\tau_1$ correlation signal is applied to multiplier 74. Multiplier 74 is similar to multiplier 12 described hereinbefore.

The output of multiplier 74 is connected to a low pass filter 76 at its input. For reasons given in connection with filter 68, filter 76 provides a substantially noise-free, second harmonic $\tau_1$ quadrature estimator signal represented by the term $\text{Im}\{C_2(\tau_1)\}$. In a manner similar to that described hereinbefore, other correlation signals are utilized by converters 38 (FIG. 3) to provide a representation of the terms, $C_n.(\tau_k)$.

Figure 7:
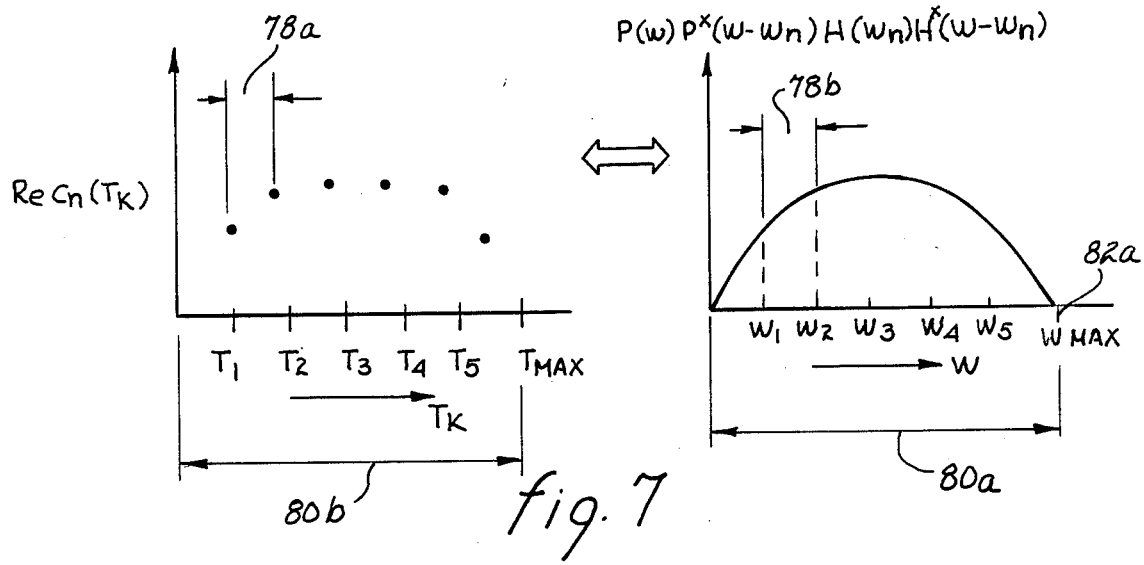
FIG. 7 is a graphical showing of a transform relationship utilized in the embodiment of FIG. 1.

As shown in FIG. 7, a representation of the outputs of converters 38 are points with equal abscissa intervals therebetween. Abscissa values of the points are representative of delay times respectively associated with the time delay networks of correlation units 36. Because of the transform relationship, an interval 78a between points having adjacent abscissa values map into an interval 80a, with a maximum frequency, 82a. It should be understood that the sizes of intervals 78a, 80a are inversely related. Accordingly, interval 78a is a choice based upon bandwidth considerations.

Correspondingly, an interval 78b between points having adjacent abscissa values map into an interval 80b. Like intervals 78a, 80a, intervals 78b, 80b are inversely related. Accordingly, the size of interval 78b is a choice based upon a desired resolution of medium transfer characteristics.

Converters 38 are connected through a plurality of signal lines 84 to simulator 24 (FIG. 1). Within simulator 24, a functional relationship is modeled as an approximation of the transfer characteristics of medium 18. As explained hereinafter, coefficients in the functional relationship are iteratively adjusted to reduce the difference between the representation of the terms, $Cn(\tau_k)$, and a corresponding representation of obtained by a computation utilizing the transform and the functional relationships. In this embodiment, the functional relationship is given as:

$$H_m(W) = \sum_{i=1}^{i=N} \frac{\epsilon_{im}}{jw - \lambda_{im}}$$

Where:
$H_m(w)$ is the $m^{th}$ iterative transfer function;
$\epsilon_{im}$ is the $m^{th}$ iterative value of the $i^{th}$ numerator coefficient;
$\lambda_{im}$ is the $m^{th}$ iterative value of the $i^{th}$ denominator coefficient; and
N is the number of coefficients, $\epsilon_i$ or $\lambda_i$, utilized in forming the functional relationship.

Simulator 24 includes a digital computer (not shown) of any suitable type to perform a Fourier transform operation on the model in accordance with the transform relationship given hereinbefore. More particularly, the transform relationship, as it relates to the model, may be written as:

$$C_{(1)n}(\tau_K) = \frac{e^{-jw_m\tau_s}}{2\pi T} \int_{-\infty}^{\infty} P(w)P^*(w - w_n)H_m(w)H_m^*(w - w_n)e^{j(w-w_m)\tau_K} dw$$

Where: $C_{(1)n}(\tau_k)$ is the discrete portion of the complex correlation of the output of the model, with a correlation delay, $\tau_k$. The terms, $C_{(1)n}(\tau_k)$, are represented by correlation model signals. The computer utilizes the output of converters 38 and the model signals to generate a signal representation of a sum square error which is given as:

$$E = \sum_m \sum_K |Cn(\tau_k) - C_{(1)n}(\tau_k)|^2$$

Where E is the sum square error

The computer iteratively adjusts the numerator and denominator coefficients to reduce the sum square error, thereby providing an estimate, with increased accuracy, of the transfer characteristics of medium 18. When the sum square error is determined to be less than a threshold level, the coefficients are utilized by simulator 22 to simulate the transfer characteristics.

In an alternative embodiment, the computer may perform a Fourier transform operation on the estimator signals to produce a set of frequency domain signals that are compared with a signal representation of the model; the difference therebetween is reduced by the iterative adjustment of the coefficients.

Thus, there is shown hereinbefore a simplified embodiment of the present invention.

Figure 8:
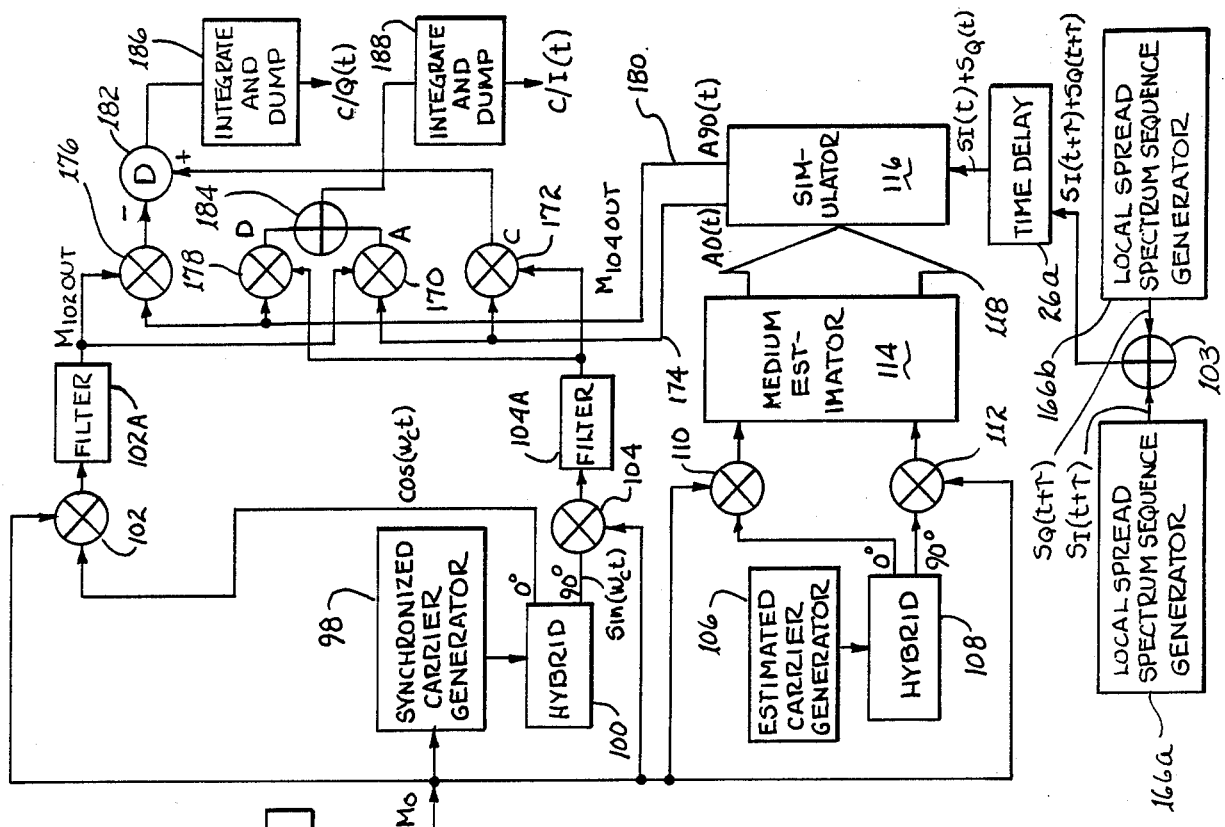
FIG. 8 is a block diagram of a second embodiment of the present invention.

As shown in FIG. 8, in a second embodiment of the present invention, a first baseband generator 84a and a second baseband generator 84b independently generate a first baseband signal and a second baseband signal respectively. The first and second baseband signals both share the baseband power density spectrum (FIG. 2a).

The output of generator 84a is connected to a multiplier unit 86a at one of two inputs thereof. The other input of multiplier 86a is connected to the output of generator 16a. Multiplier 86a is similar to multiplier 12 described in connection with the first embodiment. Accordingly, multiplier 86a provides a first spread baseband signal having the spread baseband power density spectrum (FIG. 2b).

In this embodiment, generators 16a, 116a generate first and second spread sequences that differ from each other. However, the first and second spread sequences are generated by generators 16a, 116 at the same chip rate.

When the amplitude of the first baseband signal is represented by the term, $d_I(t)$, and the amplitude of the output of generator 116a is represented by the term $S_I(t)$, the first spread baseband signal is represented by the term, $d_I(t) S_I(t)$.

In a similar manner, generator 84b is connected to a multiplier unit 86b at one of two inputs thereof. The other input of multiplier 86b is connected to generator 116a. Like multiplier 86a, multiplier 86b is similar to multiplier 12 described hereinbefore. Hence, multiplier 86b provides a second spread baseband signal having the spread baseband power density spectrum.

When the amplitude of the second baseband signal is represented by the term $d_Q(t)$, and the amplitude of the second spread baseband signal is represented by the term $S_Q(t)$, the amplitude of the output of multiplier 86b is represented by the term, $d_Q(t) S_Q(t)$.

An RF carrier generator 88 has its output connected to the input of a hybrid 90. Generator 88 provides an RF carrier signal used to RF modulate the spread signals provided by multipliers 86a, 86b in a manner explained hereinafter. Hybrid 90 is similar to hybrid 63 described in connection with the first embodiment.

In response to an RF carrier generated by generator 88, hybrid 90 provides an in-phase carrier signal, represented by the term, $\cos(w_c t)$, and a quadrature carrier signal, represented by the term sin ($w_c t$), at in-phase and quadrature outputs thereof, respectively. The in-phase output of hybrid 90 is connected to a multiplier unit 92 at one of two inputs thereof. The other input of multiplier 92 is connected to the output of multiplier 86a. Multiplier 92 is similar to multiplier 12 described hereinbefore. As shown in FIG. 2c, multiplier 92 provides an RF modulated signal having a spectrum with a central portion displaced from the origin by the carrier frequency. The output of multiplier 92 is a first modulated spread spectrum signal represented by the term, $d_I(t)S_I(t) \cos(w_c t)$.

The quadrature output of hybrid 90 is connected to a multiplier unit 94 at one of two inputs thereof. The other input of multiplier 94 is connected to the output of multiplier 86b. Like multiplier 92, multiplier 94 is similar to multiplier 12. Moreover, multiplier 94 provides an RF modulated signal having the power density spectrum with the central portion displaced from the origin. The output of multiplier 94 is a second modulated spread spectrum signal represented by the term, $d_Q(t)S_Q(t) \sin(w_c t)$.

The outputs of multipliers 92, 94 are connected to an adder 96 at respective inputs thereof. The output of adder 96 is coupled to medium 18. Adder 96 is similar to adder 16A. The amplitude of the output of adder 96 is in accordance with a relationship given as:

$$M_I = d_I(t)S_I(t) \cos(w_c t) + d_Q(t)S_Q(t) \sin(w_c t)$$

Where $M_I$ is the amplitude of a signal coupled to medium 18, which is substantially equal to the sum of the amplitudes of the first and second modulated spread spectrum signals.

Figure 8A:
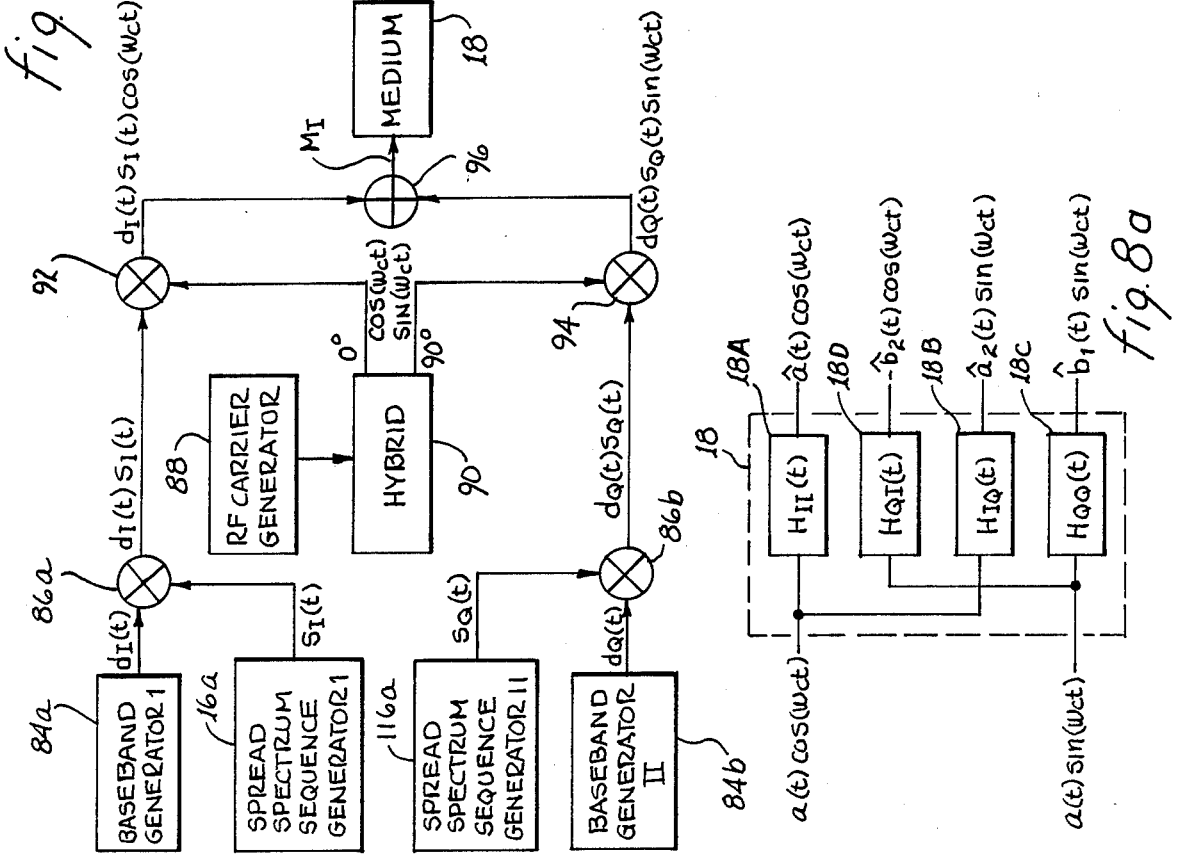
FIG. 8A is a block diagram of a medium of transmission in the embodiment of FIG. 8.

As shown in FIG. 8a, medium 18 is represented as a filter with sections 18A, 18B responsive only to input signals represented by terms proportional to $\cos(w_c t)$. The output of section 18A is in accordance with a filter relationship which is given as:

$$\hat{a}_1(t) \cos(w_c t) = H_{II}(t) * a(t) \cos(w_c t)$$

Where:
- $a(t) \cos(w_c t)$ is representative of a signal applied to the input of section 18A;
- \* is the convolution operator $(A(t)*B(t)) = \int_{-\infty}^{\infty} A(y)B(t-y)dy$ The output of section 18B is in accordance with a filter relationship which is given as:

$$\hat{a}_2(t) \sin(w_c t) = H_{IQ}(t) * a(t) \cos(w_c t)$$

Where:
- $a_2(t) \sin(w_c t)$ is representative of a signal at the output of section 18B; and
- $H_{IQ}(t)$ is the transfer function of section 18B.

Medium 18 additionally includes sections 18C and 18D which respond only to input signals represented by terms proportional to $\sin(w_c t)$. The output of section 18C is in accordance with a filter relationship which is given as:

$$\hat{b}_1(t) \sin(w_c t) = H_{QQ}(t) * b(t) \sin(w_c t)$$

Where:
- $b_1(t) \sin(w_c t)$ is representative of a signal applied to the input of section 18C;
- $H_{QQ}(t)$ is the transfer function of section 18C; and
- $\hat{b}_1(t) \sin(w_c t)$ is representative of a signal at the output of section 18C.

The output of section 18D is in accordance with a filter relationship which is given as:

$$-\hat{b}_2(t) \cos(w_c t) = H_{QI}(t) * b(t) \sin(W_c t)$$

Where:
- $-\hat{b}_2(t) \cos(w_c t)$ is representative of a signal at the output of section 18D; and
- $H_{QI}(t)$ is the transfer function of section 18D.

It should be understood that the output of medium 18 is the sum of the outputs of sections 18A, 18B, 18C, 18D. Additionally, the carat notation ( ^ ) is indicative of a distortion that may be caused by medium 18.

The propagated signal at the output of adder 96 is utilized to provide the input to medium 18. When the filter relationships given hereinbefore are utilized, the output of medium 18 is given as:

$$M_o = d_I(t)\hat{S}_{I1}(t) \cos(w_c t) + d_Q(t)\hat{S}_{Q1}(t) \sin(w_c t) + d_I(t)\hat{S}_{I2}(t) \sin(w_c t) - d_Q(t)\hat{S}_{Q2}(t) \cos(w_c t)$$

In this embodiment, the output of adder 19 is connected to the input of a synchronized carrier frequency generator 98, whereby the received signal is applied to generator 98. The output of generator 98 is a carrier signal synchronized to the output of generator 88. Synchronized carrier generators are well-known to those skilled in the art.

The output of generator 98 is connected to the input of a hybrid 100. Hybrid 100 is similar to hybrid 63. In a manner similar hybrid 90, hybrid 100 provides an in-phase synchronized carrier signal represented by the term, $\cos(w_c t)$, and a synchronized quadrature carrier signal represented by the term, $\sin(w_c t)$ at in-phase and quadrature outputs thereof, respectively.

The in-phase output of hybrid 100 is connected to a multiplier unit 102 at one of two inputs thereof. The other input of multiplier 102 is connected to the output of adder 19 whereby the received signal is applied to multiplier 102. Multiplier 102 is similar to multiplier 12.

Because multiplier 102 is connected to the in-phase output of hybrid 100, multiplier 102 synchronously demodulates a portion of the received signal that is in phase with the synchronized carrier signal. More particularly, when the output of generator 20 is neglected, the output of multiplier 102 is in accordance with a relationship which is given as:

$$M_{102out} = d_I(t)\hat{S}_{I1}(t) \frac{(1 + \cos(2w_c t))}{2} + d_I(t)\hat{S}_{I2}(t) \frac{(\sin(2w_c t))}{2} + d_Q(t)\hat{S}_{Q1}(t) \frac{(\sin(2w_c t))}{2} - d_Q(t)\hat{S}_{Q2}(t) \frac{(1 + \cos(w_c t))}{2}$$

Where: $M_{102}$ out is the output of multiplier 102.

The output of multiplier 102 is connected to the input of a low pass filter 102A. Filter 102A rejects frequency components greater than the carrier frequency, $W_c$. Hence, the output of filter 102A is in accordance with a relationship which is given as:

$$M_{102F} = \frac{d_I(t)\hat{S}_{I1}(t)}{2} - \frac{d_Q(t)\hat{S}_{Q2}(t)}{2}$$

Where $M_{102F}$ is the output of filter 102A.

Filter 102A provides a first type of in-phase spread spectrum signal.

In a similar manner, the output of adder 19 is connected to a multiplier unit 104 at one of two inputs thereof. The other input of multiplier 104 is connected to the quadrature output of hybrid 100. Multiplier 104 is similar to multiplier 12. Therefore, multiplier 104 synchronously demodulates a portion of the received signal that is in quadrature with the synchronized carrier signal. More particularly, when the output of generator 20 is neglected, the output of multiplier 104 is in accordance with a relationship which is given as:

$$M_{104out} = d_I(t)\hat{S}_{I1}(t)\frac{(\sin(2w_c t))}{2} + d_I(t)\hat{S}_{I2}\frac{(1-\cos 2w_c t)}{2} +$$

$$d_Q(t)\hat{S}_{Q1}(t)\frac{(1-\cos(2w_c t))}{2} - d_Q(t)\hat{S}_{Q2}(t)\frac{(\sin(2w_c t)}{2}$$

Where $M_{104}$ out is the output of multiplier 104.

The output of multiplier 104 is connected to the input of a low pass filter 104A. Filter 104A rejects frequency components greater than the carrier frequency, $W_c$. Hence, the output of filter 104A is in accordance with a relationship which is given as:

$$M_{104F} = \frac{d_I(t)\hat{S}_{I2}(t)}{2} + \frac{d_Q(t)\hat{S}_{Q1}(t)}{2}$$

Where $M_{104F}$ is the output of Filter 104A.

Filter 104A provides a first type of quadrature spread spectrum signal. As explained hereinafter, the first type of in-phase and quadrature spread spectrum signals are utilized to provide a pair of recovered baseband signals that are respectively similar to the first and second baseband signals.

An estimated carrier frequency generator 106 generates an estimated carrier signal having a frequency approximately equal to the frequency of the signals provided by generators 88, 98. The output of generator 106 is connected to the input of a hybrid 108, whereby the estimated carrier is applied to hybrid 108. Hybrid 108 is similar to hybrid 63.

The in-phase output of hybrid 108 is connected to a multiplier unit 110 at one of two inputs thereof. The other input of multiplier 110 is connected to the output of adder 19 whereby the received signal is applied to multiplier 110. Multiplier 110 is similar to multiplier 12.

Because multiplier 110 is connected to the in-phase output of hybrid 108, multiplier 110 down converts a portion of the received signal that is in-phase with the estimated carrier signal. Hence, multiplier 110 provides a second type of in-phase spread spectrum signal.

In a similar manner, the output of adder 19 is connected to a multiplier unit 112 at one of two inputs thereof. The other input of multiplier 112 is connected to the quadrature output of hybrid 108. Multiplier 112 is similar to multiplier 12. Therefore, multiplier 112 down converts a portion of the received signal that is in quadrature with the estimated carrier signal. Hence, multiplier 112 provides a second type of quadrature spread spectrum signal.

It should be understood that the first and second types of spread spectrum signals differ because unlike generators 88, 98, generators 88, 106 are not synchronized to each other. In an alternative embodiment, only the first type of spread spectrum signals are utilized.

The outputs of multiplier 110, 112 are connected to a medium estimator 114. Medium estimator 114 utilizes the second type of spread spectrum signals to generate a representation of the coefficients in the equation of the model of the transfer characteristics of medium 18.

Medium estimator 114 is connected to a simulator 116 through a plurality of signal lines 118, whereby the signal representation of the coefficients is provided to simulator 116. Simulator 116 is additionally connected to the output of an adder 103 through a time delay network 26a. The inputs of adder 103 are connected to the outputs of local spread sequence generators 166a, 166b, respectively.

Generators 166a, 166b are similar to generators 16a, 116a, respectively. Moreover, generator 166a is synchronized to generator 16a. Similarly generator 166b is synchronized to generator 116a. Adder 103 and delay network 26a are respectively similar to adder 12 and delay network 26.

Figure 9:
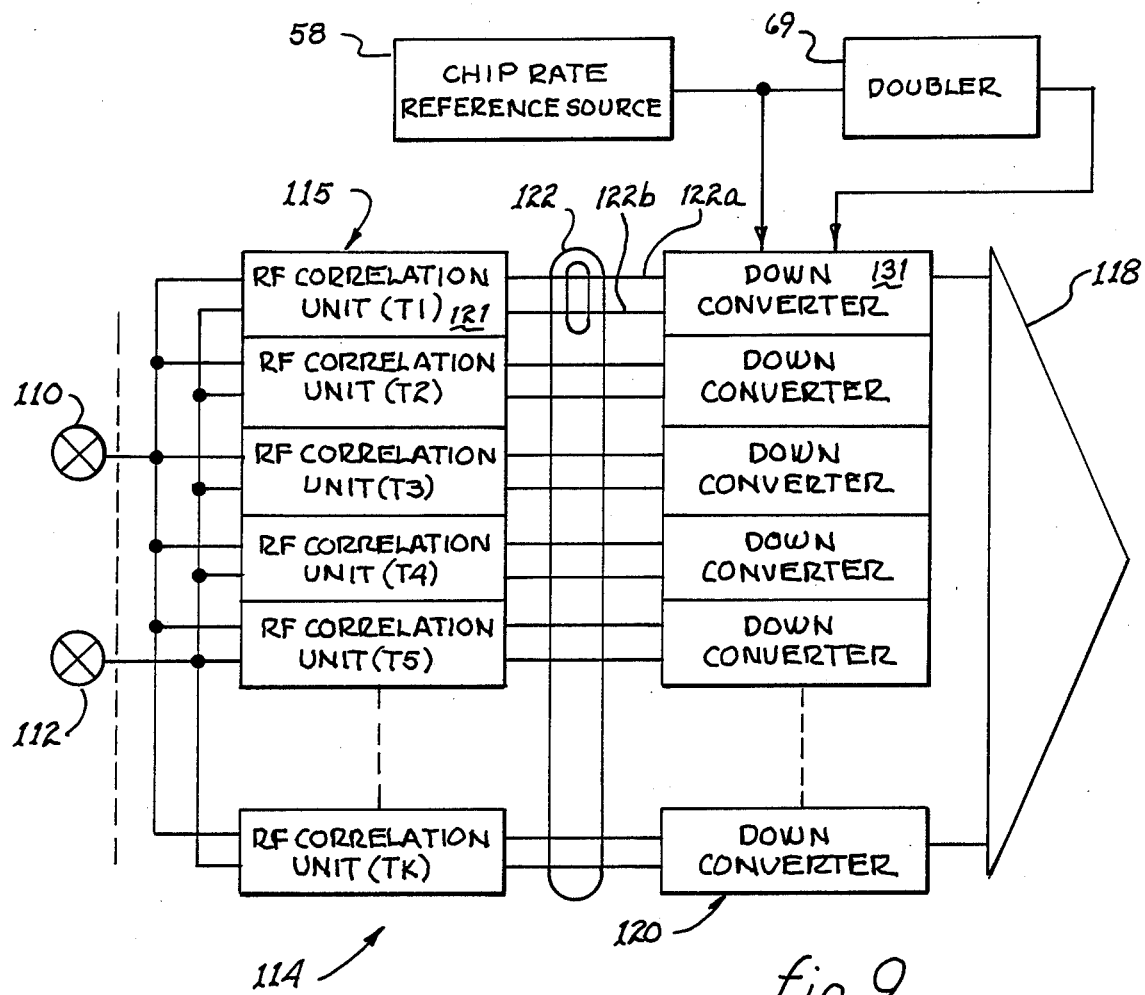
FIG. 9 is a block diagram of a medium estimator in the embodiment of FIG. 8.

As shown in FIG. 9, medium estimator 114 is comprised of a plurality of correlation units 115, each of which is connected to the outputs of multipliers 110, 112. Additionally, the outputs of correlation units 115 are respectively connected to a plurality of down converters 120 through a plurality of pairs of signal lines 122. In a manner analogous to converters 38, each of converters 120 provides signal representations of four of the terms of a modified transform relationship which is given as:

$$C_n(\tau_K) = \frac{e^{j(w_0\tau K - w_m\tau s)}}{2\pi T}\int_{-\infty}^{\infty} P(w)\,P^*(W-$$

$$W_n)\,H(W)H^*(W-W_n)e^{j(w-w_m)\tau K}\,dw$$

Where Wo is a difference in frequency between generators 88, 106.

Like correlation units 36 of the first embodiment, each of correlation units 115 includes the delay network with the unique value of delay.

Figure 10:
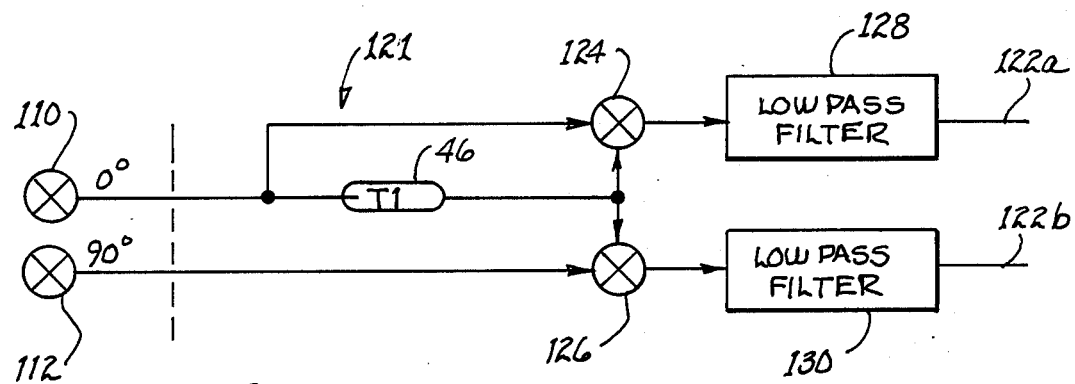
FIG. 10 is a block diagram of a correlator in the medium estimator of FIG. 9.

As shown in FIG. 10, correlation units 115 include a typical correlation unit 121 comprised of delay network 46 with its input connected to the output of multiplier 110. Additionally, the output of multiplier 110 is connected to a multiplier unit 124 at one of two inputs thereof. The other input of multiplier 124 is connected to the output of delay network 46. Therefore, the second type of in-phase spread spectrum signal is applied to delay network 46 and multiplier 124. Multiplier 124 is similar to multiplier 12.

The output of delay network 46 is additionally connected to a multiplier unit 126 at one of two inputs thereof. The other input of multiplier 126 is connected to the output of multiplier 112. Therefore, the second type of quadrature spread spectrum signal is applied to multiplier 126. Multiplier 126 is similar to multiplier 12.

The output of multiplier 124 has a component proportional to an in-phase part of the complex correlation of the received signal with a delay, $\tau_1$, and a noise component. Correspondingly, the output of multiplier 126 has a component proportional to a quadrature part of the complex correlation of the received signal with a delay, $\tau_1$, and a noise component. It should be understood that the $\tau_1$ in-phase and quadrature correlation signals are spectrally discrete, similar to the correlation signals described in connection with the first embodiment.

The outputs of multipliers 124, 126 are respectively connected to low pass filters 128, 130 at inputs thereof. Filters 128, 130 reject noise produced by multipliers 124, 126, respectively.

Converters 120 are additionally connected to source 58 and doubler 69 described hereinbefore (FIG. 9). Converters 120 include a typical converter 131 which is similar to all others of converters 120.

Figure 11:
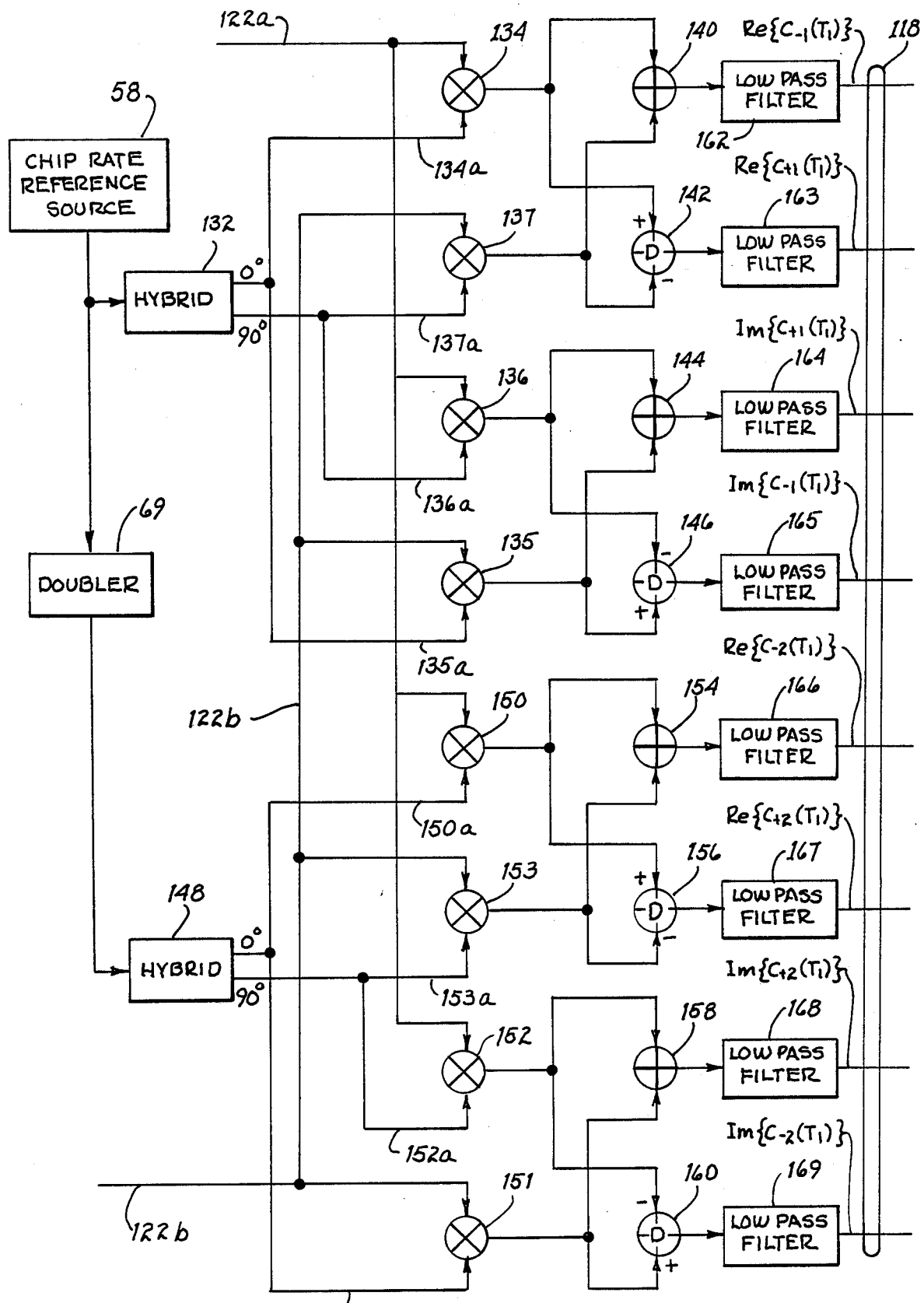
FIG. 11 is a block diagram of a down converter in the medium estimator of FIG. 9.

As shown in FIG. 11, source 58 is connected within converter 131 to hybrid 132 at its input. The in-phase output of hybrid 132 is connected to multiplier units 134, 135 at inputs thereof through signal lines 134a, 135a, respectively. The other inputs of multipliers 134, 135 are connected to unit 121 (FIG. 9) through signal lines 122a, 122b, respectively. Multipliers 134, 135 are similar to multiplier 12. Multipliers 134, 135 down convert the $\tau_1$ in-phase and quadrature correlation signals in a manner corresponding to that described in connection with the first embodiment.

The quadrature output of hybrid 132 is connected to multiplier units 136, 137 at inputs thereof through signal lines 136a, 137a, respectively. The other inputs of multipliers 136, 137 are connected to unit 121 through signal lines 122a, 122b, respectively. Multipliers 136, 137 are similar to multiplier 12. Multipliers 136, 137 down convert the $\tau_1$ in-phase and quadrature correlation signals in a manner corresponding to that described in connection with the first embodiment.

The outputs of multipliers 134, 137 are connected to respective inputs of an adder 140. Adder 140 is similar to adder 16A. Adder 140 provides a $\tau_1$ first harmonic estimator signal represented by the term, $Re\{C_{-1}(\tau_1)\}$, and noise.

The outputs of multipliers 134, 137 are additionally connected to a subtractor 142 at respective inputs thereof. Subtractor 142 is similar to subtractor 89a. Subtractor 142 provides a $\tau_1$ first harmonic in-phase estimator signal, represented by the term, $Re\{C_{+1}\{\tau_1\}\}$, and noise.

The outputs of multipliers 135, 136 are connected to respective inputs of an adder 144. Adder 144 is similar to adder 16A. Because of the phase of signals applied to multipliers 135, 136, adder 144 provides a $\tau_1$ first harmonic quadrature estimator signal, represented by the term, $Im\{C_{+1}(\tau_1)\}$, and noise.

The outputs of multipliers 135, 136 are additionally connected to a subtractor 146 at respective inputs thereof. Subtractor 146 is similar to subtractor 89a. Subtractor 146 provides a $\tau_1$ first harmonic quadrature estimator signal, which is represented by the term, $Im\{C_{-1}(\tau_1)\}$, and noise.

The output of doubler 69 is connected to a hybrid 148 at its input. The in-phase output of hybrid 148 is connected to multiplier units 150, 151 at inputs thereof through signal lines 150a, 151a, respectively. The other inputs of multipliers 150, 151 are connected to unit 121 through signal lines 122a, 122b, respectively. Multipliers 150, 151 are similar to multiplier 12. Multipliers 150, 151 down convert the $\tau_1$ in-phase and quadrature correlation signals in a manner corresponding to that described in connection with the first embodiment.

The quadrature output of hybrid 148 is connected to multiplier units 152, 153 at inputs thereof through signal lines 152a, 153a, respectively. The other inputs of multipliers 152, 153 are connected to unit 121 through signal lines 122a, 122b, respectively. Multipliers 152, 153 are similar to multiplier 12. Multipliers 152, 153 down convert the $\tau_1$ in-phase and quadrature correlation signals in a manner corresponding to that described in connection with the first embodiment.

The outputs of multipliers 150, 153 are connected to respective inputs of an adder 154. Adder 154 is similar to adder 16A. Because of the phase of signals applied to multipliers 150, 153, adder 154 provides a $\tau_1$ second harmonic in-phase estimator signal represented by the term, $Re\{C_{-2}\{\tau_1\}\}$, and noise.

The outputs of multipliers 150, 153 are additionally connected to a subtractor 156 at respective inputs thereof. Subtractor 156 is similar to subtractor 142. Subtractor 156 provides a $\tau_1$ second harmonic in-phase estimator signal represented by the term, $Re\{C_{+2}\{\tau_1\}\}$, and noise.

The outputs of multipliers 151, 152 are connected to respective inputs of an adder 158. Adder 158 is similar to adder 16A. Because of the phase of signals applied to multipliers 151, 152, adder 158 provides a $\tau_1$ second harmonic quadrature estimator signal represented by the term, $Im\{C_{+2}(\tau_1)\}$, and noise.

The outputs of multipliers 151, 152 are additionally connected to a subtractor 160 to respective inputs thereof. Subtractor 160 is similar to subtractor 142. Subtractor 160 provides a $\tau_1$ second harmonic quadrature estimator signal represented by the term, $Im\{C_{-2}(\tau_1)\}$, and noise.

The outputs of adder 140, subtractor 142, adder 144 and subtractor 146 are respectively connected to low pass filters 162-165 at their inputs. Filters 162-165 reject the noise provided by multipliers 134-137. The outputs of filters 162-165 are connected to simulator 116 through some of lines 118 as described hereinafter.

Similarly, the outputs of adder 154, subtractor 156, adder 158 and subtractor 160 are respectively connected to low pass filters 166-169 at their inputs. Filters 166-169 reject the noise provided by multipliers 150-153. The outputs of filters 166-169 are connected to simulator 116 through some of lines 118 as described hereinbefore.

In response to the estimator signals, simulator 116 (FIG. 8) simulates the transfer characteristics of medium 18. Simulator 116 provides modified first and second spreading signals. The modified first spreading signal is in accordance with a relationship which is given as:

$$A_o(t) = \hat{S}_{I1}(t) + \hat{S}_{Q1}(t)$$

Where: $A_o(t)$ is representative of the amplitude of the modified first spreading signal.

Correspondingly, the modified second spreading signal is in accordance with a relationship which is given as:

$$A_{90}(t) = \hat{S}_{I2}(t) + \hat{S}_{Q2}(t)$$

Where: $A_{90}(t)$ is representative of the amplitude of the modified second spreading signal.

The first modified spreading signal is applied to multipliers 170, 172 at one of two inputs of each, via a signal line 174. The second modified spreading signal is applied to multiplier units 176, 178 at one of two inputs of each, via a signal line 180. Multipliers 170, 172, 176, 178 are all similar to multiplier 12.

The other inputs of multipliers 170, 176 are connected to the output of multiplier 102. The other inputs of multipliers 172, 178 are connected to the output of multiplier 104.

The output of multiplier 170 is in accordance with a relationship which is given as:

$$M_{170}(t) = \frac{d_I(t)}{2}(\hat{S}_{I1}(t))^2 - \frac{d_Q(t)}{2}\hat{S}_{Q2}(t)\hat{S}_{Q1}(t) + \frac{d_I(t)}{2}\hat{S}_{I1}(t)\hat{S}_{Q1}(t) - \frac{d_Q(t)}{2}\hat{S}_{Q2}(t)\hat{S}_{I1}(t)$$

Where $M_{170}(t)$ is representative of the amplitude of the output of multiplier 170.

Correspondingly, the output of multiplier 172 is in accordance with a relationship which is given as:

$$M_{172}(t) = \frac{d_I(t)}{2}\hat{S}_{I2}(t)(\hat{S}_{I1}(t) + \hat{S}_{Q1}(t)) + \frac{d_Q(t)}{2}\hat{S}_{Q}(t)(\hat{S}_{I1}(t) + \hat{S}_{Q1}(t))$$

Where: $M_{172}(t)$ is representative of the amplitude of the output of multiplier 172.

The output of multiplier 176 is in accordance with a relationship which is given as:

$$M_{176}(t) = \frac{d_I(t)}{2}\hat{S}_{I1}(t)(\hat{S}_{I2}(t) + \hat{S}_{Q2}(t)) - \frac{d_Q(t)}{2}\hat{S}_{Q2}(t)(\hat{S}_{I2}(t) + \hat{S}_{Q2}(t))$$

Where: $M_{176}(t)$ is representative of the amplitude of the output of multiplier 176.

Similarly, the output of multiplier 178 is in accordance with a relationship which is given as:

$$M_{178}(t) = \frac{d_I(t)}{2}(\hat{S}_{I2}(t))^2 + \frac{d_Q(t)}{2}\hat{S}_{Q1}(t)\hat{S}_{Q2}(t) + \frac{d_I(t)}{2}\hat{S}_{I2}(2)\hat{S}_{Q2}(t) + \frac{d_Q(t)}{2}\hat{S}_{Q1}(t)\hat{S}_{I2}(t)$$

Where $M_{178}(t)$ is representative of the amplitude of the output of multiplier 178.

The outputs of multipliers 172, 176 are connected to respective inputs of a subtractor 182. Subtractor 182 is similar to subtractor 89a. Moreover, the output of subtractor 182 is in accordance with an output relationship which is given as:

$$\hat{D}_{2out}(t) = \frac{d_I(t)}{2}(\hat{S}_{I2}(t)\hat{S}_{Q1}(t) - \hat{S}_{I1}(t)\hat{S}_{Q2}(t)) + \frac{d_Q(t)}{2}((\hat{S}_{Q1}(t))^2 + (\hat{S}_{Q2}(t))^2 + \hat{S}_{Q1}(t)\hat{S}_{I1}(t) - \hat{S}_{Q2}(t)\hat{S}_{I2}(t)$$

Where $D_{2out}(t)$ is representative of the amplitude of the output of subtractor 182.

It should be understood that because the first and second spread sequences differ from each other, terms such as $\hat{S}_{I2}(t)\hat{S}_{Q1}(t)$, $\hat{S}_{I1}(t)\hat{S}_{Q2}(t)$, $\hat{S}_{Q1}(t)\hat{S}_{I1}(t)$ and $\hat{S}_{Q2}(t)\hat{S}_{I2}(t)$ all integrate to essentially zero over a data pulse period. Moreover, the terms $(S_{Q1}(t))^2$ and $(S_{Q2}(t))^2$ sum to unity, assuming that medium 18 is lossless. The output of subtractor 182 is connected to the input of an integrate and dump circuit 186 similar to circuit 24A described hereinbefore. Because of the integration provided by circuit 186, the output circuit 186 reduces to the term, $d_Q(t)$.

Therefore, in response to the output of subtractor 182, circuit 186 provides a recovered baseband signal substantially equal to the second baseband signal.

The output of multipliers 170, 178 are connected to respective inputs of an adder 184. Adder 184 is similar to adder 16A. The output of adder 184 is connected to an integrate and dump circuit 188, similar to circuit 24A. In a manner similar to that described in connection with circuit 186, circuit 188 provides a recovered baseband signal substantially equal to the first baseband signal.

While the invention has been particularly shown and described with reference to preferred embodiments thereof, it should be understood by those skilled in the art that changes in the form and detail may be made therein without departing from the spirit and scope of the invention.

We claim:

1. In the method of estimating transfer characteristics of a propagation medium from a cyclostationary signal received therefrom comprising the steps of:
   generating a plurality of estimator signals only from the received cyclostationary signal, each of which is representative of a spectrally discrete portion of a correlation of said received signal; and
   using said plurality of estimator signals to provide an estimate of the transfer characteristics of the medium.

2. In the method of claim 1 wherein the step of generating said estimator signals includes the step of generating a correlation signal proportional to the correlation of said received signal with a known correlation delay.

3. In the method of claim 1 wherein the step of generating said estimator signals includes the step of filtering out noise that is spectrally diffuse.

4. In the method of claim 2 wherein the step of generating said correlation signal includes the step of delaying said received signal by said correlation delay to provide a delayed received signal, said correlation signal being proportional to the product of the amplitude of said delayed received signal and the amplitude of said received signal.

5. In the method of claim 2 wherein the step of generating said estimator signals includes the step of down converting to DC a spectrally discrete component of said correlation signal that is in phase with a harmonic of the chip rate of said received signal.

6. In the method of claim 2 wherein the step of generating said estimator signals includes the step of demodulating a spectrally discrete component of said correlation signal that is in quadrature with a harmonic of the received signal.

7. The method of claim 1 wherein said estimate is provided by the following equation:

$$C_{(1)n}(\tau_K) = \frac{e^{-jw_m\tau_s}}{2\pi T}\int_{-\infty}^{\infty} P(w)P^*(w - w_m)H_m(w)H_m^*(w - w_m)e^{j(w-w_m)\tau K}dw$$

Where:
$C_{(1)n}(\tau_k)$ is the discrete portion of the complex correlation of said received signal, with a correlation delay
T is the clock period of the received signal;
n is an index of harmonics of the clock rate;
w is radian frequency;

$w_n$ is the radian frequency of a harmonic of the clock rate;

$\tau s$ is a timing synchronization error;

P(w) is the Fourier transform of the baseband signal;

$P^*(w-w_n)$ is the complex conjugate of $P(w-w_m)$;

$H_m(w)$ is the transfer function of the model; and $H_m^*(w-w_n)$ is the complex conjugate of $H_m(w-w_n)$.

8. The method of claim 1 wherein said estimate is given as $H_m(w)$ which is defined as follows:

$$H_{m(w)} = \sum_{i=1}^{i=N} \frac{\epsilon im}{jw - \lambda im}$$

Where:

$H_{m(w)}$ is the $m^{th}$ iterative estimate;

$\epsilon m$ is the $m^{th}$ iterative value of the $i^{th}$ numerator coefficient;

$\lambda im$ is the $m^{th}$ iterative value of the $i^{th}$ denominator coefficient; and N is the number of coefficients $\epsilon i$ or $\lambda i$ utilized in forming said estimate.

9. In the method of claim 1 wherein the received signal is multiplied by an estimated radio frequency carrier signal including the steps of:

generating an in-phase received signal proportional to the product of the amplitude of an in-phase component of an estimated carrier signal and the amplitude of said received signal; and generating a quadrature received signal proportional to the product of the amplitude of a quadrature component of said estimated carrier signal and the amplitude of said received signal.

10. In the method of claim 9 wherein the step of generating said estimator signals includes the step of generating a signal proportional to an in-phase part of the complex correlation of said received signal with a known correlation delay.

11. In the method of claim 10 wherein the step of generating said in-phase complex correlation signal includes the step of delaying said in-phase received signal by said correlation delay to provide a delayed in-phase received signal, said in-phase complex correlation signal being proportional to the product of the amplitude of said delayed in-phase received signal and the amplitude of said in-phase received signal.

12. In the method of claim 9 wherein the step of generating said estimator signals includes the step of generating a signal proportional to a quadrature part of the complex correlation of said received signal with a known correlation delay.

13. In the method of claim 12 wherein the step of generating said quadrature complex correlation signal includes the step of delaying said in-phase received signal by said correlation delay, to provide a delayed in-phase received signal, said quadrature correlation signal being proportional to the product of the amplitude of said delayed in-phase received signal and the amplitude of said quadrature received signal.

14. In the method of claim 9 wherein the carrier frequency of said received signal and the frequency of said estimated carrier signal are of the same frequency.

15. Apparatus for providing an estimate of transfer characteristics of a propagation medium from a cyclostationary signal received therefrom comprising, in combination:

means for generating a plurality of estimator signals only from the received cyclostationary signal, each of which is representative of a spectrally discrete portion of a correlation of said received signal; and means for using said plurality of estimator signals to provide an estimate of the transfer characteristics of the medium.

16. The apparatus of claim 15 wherein said generating means includes means for generating a correlation signal proportional to the correlation of said received signal with a known correlation delay.

17. The apparatus of claim 15 wherein said generating means includes means for filtering out noise that is spectrally diffuse.

18. The apparatus of claim 16 wherein said means for generating said correlation signal comprises:

a time delay network having an input where said received signal is applied, said network providing an output substantially the same as an input signal applied thereto, but delayed by a known time; and a multiplier unit having one of two inputs for said received signal, the output of said network being connected to the other input, said correlation signal being provided at the output of said multiplier with a correlation delay substantially equal to said known time.

19. The apparatus of claim 16 wherein said generating means includes means for down-converting to DC a spectrally discrete component of said correlation signal that is in-phase with a harmonic of a clock rate of said received signal.

20. The apparatus of claim 16 wherein said generating means includes means for down converting to DC a spectrally discrete component of said correlation signal that is in quadrature with a harmonic of a clock rate of said received signal.

21. The apparatus of claim 15 wherein said estimate is provided by the following equation:

$$C_{(1)n}(\tau_K) = \frac{e^{-jw_m\tau s}}{2\pi T} \int_{-\infty}^{\infty} P(w)P^*(w - w_m)H_m(w)H_m^*(w - w_m)e^{j(w-w_m)\tau K} dw$$

Where:

$C_{(1)n}(\tau_k)$ is the discrete portion of the complex correlation of said received signal, with a correlation delay $\tau k$ T is the clock period;

n is an index of harmonics of the clock rate;

w is radian frequency;

$\tau_s$ is a timing synchronization error;

P(w) is the Fourier transform of the baseband signal;

$P^*(w-w_n)$ is the complex conjugate of $P(w-w_n)$;

$H_m^*(w-w_n)$ is the complex conjugate of $Hm(w-w_n)$;

$H_m(w)$ is the estimate of the transfer function of the medium.

22. The apparatus of claim 15 wherein said estimate is given as $H_m(w)$ which is defined as follows:

$$H_{m(w)} = \sum_{i=1}^{i=N} \frac{\epsilon im}{jw - \lambda im}$$

Where:

$H_m(w)$ is the $m^{th}$ iterative estimate;

$\epsilon m$ is the $m^{th}$ iterative value of the $i^{th}$ numerator coefficient;

$\lambda im$ is the $m^{th}$ iterative value of the $i^{th}$ denominator coefficient; and N is the number of coefficients $\epsilon_i$ or $\lambda_i$ utilized in forming said estimate.

23. The apparatus of claim 15 wherein the received signal is multiplied by an estimated radio frequency carrier signal;
   means for generating an in-phase received signal proportional to the product of the amplitude of an in-phase component of an estimated carrier signal and the amplitude of a signal received from said medium; and
   means for generating a quadrature received signal proportional to the product of the amplitude of a quadrature component of said estimated carrier signal and the amplitude of said received signal.

24. The apparatus of claim 23 wherein said generating means includes means for generating a signal proportional to an in-phase part of the complex correlation of said received signal with a known time delay.

25. The apparatus of claim 24 wherein said generating means comprises:
   a time delay network having an input where said in-phase received signal is applied, said network providing an output substantially the same as an input signal applied thereto, but delayed by a known time; and
   a multiplier unit having one of two inputs where said in-phase received signal is applied, the output of said delay network being connected to the other input of said multiplier, the output of said multiplier being an in-phase portion of the complex correlation of said received signal with a correlation delay of said known time.

26. The apparatus of claim 25 wherein said generating means comprises:
   a multiplier unit having one of two inputs where said quadrature received signal is applied, the output of said delay network being connected to the other input of said multiplier, the output of said multiplier being a quadrature portion of the complex correlation of said received signal with a correlation delay of said known time.

27. The apparatus of claim 26 wherein said generating means comprises:
   means for down converting to DC a part of said in-phase portion of said complex correlation signal that is in-phase with a harmonic of the clock rate of said received signal;
   means for down converting to DC a part of said in-phase portion of said complex correlation signal that is in quadrature with said harmonic of the clock rate of said received signal;
   means for down converting to DC a part of said quadrature portion of said complex correlation signal that is in-phase with said harmonic of the clock rate of said received signal; and
   means for down converting to DC a part of said quadrature portion of said complex correlation signal that is in quadrature with said harmonic of the clock rate of said received signal.

28. The apparatus of claim 27 wherein at least one of said down converting means comprises a multiplying unit.

29. In the method of recovering a baseband signal from a spread spectrum signal received from a propagation medium, said spread spectrum signal being generated by modulating the baseband signal with a reference spreading signal, the steps of:
   generating a plurality of estimator signals, each of which is representative of a spectrally discrete portion of a correlation of said received signal;
   providing a representation of an assumed set of values of coefficients of an equation of the transfer function of a model that is an estimate of the transfer characteristics of the medium;
   generating a plurality of model signals, respectively corresponding to said estimator signals, in accordance with a relationship between a discrete portion of the correlation of the output of said model and the transfer function of said model;
   iteratively adjusting said values to reduce differences between said estimator signals and said respectively corresponding model signals; and
   providing a local spreading signal synchronized to said reference spreading signal, that is modified in accordance with the estimated transfer function.

30. In the method of claim 29 wherein the step of generating said estimator signals includes the step of generating a correlation signal proportional to the correlation of said received signal with a known correlation delay.

31. In the method of claim 29 wherein the step of generating said estimator signals includes the step of filtering out noise that is spectrally diffuse.

32. In the method of claim 30 wherein the step of generating said correlation signal includes the step of delaying said received signal by said correlation delay to provide a delayed received signal, said correlation signal being proportional to the product of the amplitude of said delayed received signal and the amplitude of said received signal.

33. In the method of claim 30 wherein the step of generating said estimator signals includes the step of down converting to DC a spectrally discrete component of said correlation signal that is in phase with a harmonic of the chip rate of said spreading signal.

34. In the method of claim 30 wherein the step of generating said estimator signals includes the step of demodulating a spectrally discrete component of said correlation signal that is in quadrature with a harmonic of the spreading signal.

35. The method of claim 29 wherein said relationship is given as:

$$C_{(1)n}(\tau_K) = \frac{e^{-jw_m\tau_s}}{2\pi T} \int_{-\infty}^{\infty} P(w)P^*(w - w_m)H_m(w)H_m^*(w - w_m)e^{j(w-w_m)\tau_K} dw$$

Where:
  $C_{(1)n}(\tau_K)$ is the discrete portion of the complex correlation of the model, with a correlation delay, $\tau_K$;
  T is the chip period of said received signal;
  m is an index of harmonics of the chip rate;
  w is radian frequency;
  $w_n$ is the radian frequency of a harmonic of the chip rate;
  $\tau_s$ is a timing synchronization error;
  P(w) is the Fourier transform of the baseband signal;
  $P^*(w-w_n)$ is the complex conjugate of $P(w-w_n)$;
  $H_m(w)$ is the estimate of the transfer function of the medium; and
  $H_m^*(w-w_n)$ is the complex conjugate of $H_m(w-w_n)$.

36. The method of claim 29 wherein said transfer function of said model is given as:

$$H_{m(w)} = \sum_{i=1}^{i=N} \frac{\epsilon im}{jw - \lambda im}$$

Where:
$H_{m(w)}$ is the $m^{th}$ iterative estimate
$\epsilon im$ is the $m^{th}$ iterative value of the $i^{th}$ numerator coefficient;
$\lambda im$ is the $m^{th}$ iterative value of the $i^{th}$ denominator coefficient; and
N is the number of coefficients $\epsilon i$ or $\lambda i$ utilized in forming said estimate.

37. In the method of claim 29 wherein the received signal is multiplied by an estimated radio frequency carrier signal, including the steps of:
generating an in-phase spread spectrum signal proportional to the product of the amplitude of an in-phase component of an estimated carrier signal and the amplitude of a signal received from said medium; and
generating a quadrature spread spectrum signal proportional to the product of the amplitude of a quadrature component of said estimated carrier signal and the amplitude of said received signal.

38. In the method of claim 37 wherein the step of generating said estimator signals includes the step of generating a signal proportional to an in-phase part of the complex correlation of said received signal with a known correlation delay.

39. In the method of claim 38 wherein the step of generating said in-phase complex correlation signal includes the step of delaying said in-phase spread spectrum signal by said correlation delay to provide a delayed in-phase spread spectrum signal, said in-phase complex correlation signal being proportional to the product of the amplitude of said delayed in-phase spread spectrum signal and the amplitude of said in-phase spread spectrum signal.

40. In the method of claim 37 wherein the step of generating said estimator signals includes the step of generating a signal proportional to a quadrature part of the complex correlation of said received signal with a known correlation delay.

41. In the method of claim 40 wherein the step of generating said quadrature complex correlation signal includes the step of delaying said in-phase spread spectrum signal by said correlation delay to provide a delayed in-phase spread spectrum signal, said quadrature correlation signal being proportional to the product of the amplitude of said delayed in-phase spread spectrum signal and the amplitude of said quadrature spread spectrum signal.

42. In the method of claim 37 wherein the carrier frequency of said received signal and the frequency of said estimated carrier signal are of the same frequency.

43. A matched filter for received spread signals that are demodulated by sequences provided by first and second spread sequence generators, respectively, to provide first and second spread baseband signals, said sequences being of the same chip rate but differing from each other, comprising:
generating means for providing an in-phase RF carrier signal and a quadrature RF carrier signal that are phase shifted 90° from each other;
means for downconverting said received spread signals with said in-phase and quadrature RF signals, respectively, to provide a pair of first and second baseband spread spectrum signals, said downconverting means being adapted for coupling to a medium through which said received spread spectrum signals are propagated;
estimating means coupled to said medium for generating a representation of the coefficients of an equation of a model of the transfer characteristics of said medium;
simulation means for providing first and second spreading signals that are modified by said model; and
recovery means for providing first and second recovered baseband signals in response to said spreading signals and said first and second baseband spread spectrum signals.

44. The matched filter of claim 43 wherein said generating means comprises:
an RF carrier generator synchronized to said received signal; and
a hybrid that has its input connected to the output of said carrier generator, and outputs that provide an inphase synchronized carrier signal and a quadrature synchronized carrier signal.

45. The matched filter of claim 43 wherein the signal coupled to said medium for propagation therethrough is in accordance with a relationship which is given as:

$$M_I(t) = d_I(t) S_I(t) \cos(w_c t) + d_Q(t) S_Q(t) \sin(w_c t)$$

Where:
$M_I(t)$ represents the amplitude of said signal coupled to said medium;
$d_I(t)$ represents the amplitude of the first baseband signal;
$S_I(t)$ represents the amplitude of the output of the first spread sequence generator;
$W_c$ represents the carrier frequency;
$d_Q(t)$ represents the amplitude of the second baseband signal; and
$S_Q(t)$ represents the amplitude of the output of the second spread sequence generator.

46. The matched filter of claim 43 wherein said received signal is in accordance with a relationship which is given as:

$$M_O(t) = d_I(t)\hat{S}_{I1}(t) \cos(W_c t) + d_Q(t)\hat{S}_{Q1}(t) \sin(W_c t) + d_I(t)\hat{S}_{I2}(t) \sin(W_c t) - d_Q(t)\hat{S}_{Q2}(t) \cos(W_c t)$$

Where:
$M_o(t)$ represents said received signal;
the carat ($\hat{\ }$) notation is indicative of distortion that may be caused by said member;
$\hat{S}_{I1}(t)$ is the amplitude of a component of said received signal provided in reference to said first spread baseband signal;
$d_I(t)$ is the amplitude of said first baseband signal;
$\hat{S}_{Q2}(t)$ is the amplitude of a component of said received signal provided in response to said second spread baseband signal; and
$d_Q(t)$ is the amplitude of said second baseband signal.

47. The matched filter of claim 43 wherein said estimating means includes:
means for generating an estimated carrier signal that has a frequency that is an estimate of said carrier frequency;
means for down shifting said received signal with said estimated carrier signal, thereby providing a frequency shifted spread spectrum signal comprising a frequency shifted in-phase spread spectrum signal and a frequency shifted quadrature spread spectrum signal; and means for approximating the transfer function of said medium.

48. The matched filter of claim 47 wherein said means for down shifting said received signal comprises:
a hybrid with the input thereof connected to said estimated carrier generating means; and
a multiplier unit having a pair of inputs coupled to the output of said medium and connected to the in-phase output of said hybrid, respectively, said multiplier unit providing a frequency shifted in-phase spread spectrum signal having an amplitude proportional to the product of the amplitudes of the output of said medium and the amplitude of the estimated carrier generating means.

49. The matched filter of claim 47 wherein said means for downshifting includes means for downshifting said received signal with a 90° shifted version of said estimated carrier signal, thereby providing a frequency shifted quadrature spread spectrum signal.

50. The matched filter of claim 49 wherein said means for down shifting said quadrature portion of said received signal comprises:
a hybrid with the input thereof connected to said estimated carrier generating means; and
a multiplier unit having a pair of inputs coupled to the output of said medium and connected to the quadrature output of said hybrid, respectively.

51. The matched filter of claim 43 wherein said means for downconverting includes:
means for in-phase downconverting a portion of said received signal with said in-phase carrier signal; and
an in-phase filter connected to said in-phase downconverting means for providing a signal in accordance with a relationship which is given as:

$$M_{102OUT}(t) = \frac{d_I(t)\, \hat{S}_{I1}(t)}{2} - \frac{d_Q(t)\, \hat{S}_{Q2}(t)}{2}$$

Where:
$M_{102OUT}(t)$ is the output of said in-phase filter;
$\hat{S}_{I1}(t)$ in the amplitude of a component of said received signal provided in response to said first spread baseband signal, where the carat notation indicates distortion;
$d_I(t)$ is the amplitude of said first baseband signal;
$\hat{S}_{Q2}(t)$ is the amplitude of a component of said received signal provided in response to said second spread baseband signal, where the carat notation indicates distortion; and
$d_Q(t)$ is the amplitude of said second baseband signal.

52. The matched filter of claim 43 wherein said means for downconverting includes:
means for quadrature downconverting a portion of said received signal with said quadrature carrier signal; and
a quadrature filter connected to said quadrature demodulating means for providing a signal in accordance with a relationship which is given as:

$$M_{104OUT}(t) = \frac{d_I(t)\, \hat{S}_{I2}(t)}{2} + \frac{d_Q(t)\, \hat{S}_{Q1}(t)}{2}$$

Where:

$M_{104OUT}(t)$ is the output of said quadrature filter;
$\hat{S}_{I2}(t)$ is the amplitude of a component of said received signal provided in response to the output of said first spread sequence generator, where the carat notation indicates distortion; and
$\hat{S}_{Q1}(t)$ is the amplitude of the output of a component of said received signal provided in response to the output of said second spread sequence generator, where the carat notation indicates distortion.

53. The matched filter of claim 47 wherein said approximating means is provided in response to said frequency shifted spread spectrum signal.

54. The matched filter of claim 47 wherein said approximating means includes means for providing representations of the $C_n(\tau_k)$ terms of a relationship which is given as:

$$C_n(\tau_K) = e^{j\frac{(w_o \tau_K - w_n \tau_s)}{2\pi T}} \int_{-\infty}^{\infty} P(w) P^*(w - w_n) H(w) H^*(w - w_n) e^{j(w - w_m)\tau_K} dw$$

Where:
$C_n(\tau_k)$ is a term of said relationship with a delay time, $\tau_k$;
$W_o$ is a difference in frequency of said carrier signal and said estimated carrier signal;
$W_n$ is the radian frequency of a harmonic of the chip rate with an index n;
T is the chip period of said received signal;
$\tau_s$ is a timing synchronization offset;
$P(w)$ is the Fourier transform of a pulse provided by one of said spread spectrum sequence generators; and
$H(w)$ is the estimate of the transfer function of said medium.

55. The matched filter of claim 47 wherein said approximating means includes a correlation unit comprising:
time delay means connected to said means for downshifting for providing said frequency shifted in-phase spread spectrum signal delayed by a known time;
first multiplier means having one input connected to said means for downshifting and another input connected to said time delay means for providing a signal having an amplitude directly related to the product of the amplitudes of said delayed frequency shifted in-phase spread spectrum signal and said frequency shifted in-phase spread spectrum signal;
second multiplier means having one input connected to said means for downshifting and another input connected to said time delay means for providing a signal having an amplitude directly related to the product of the amplitudes of said delayed frequency shifted in-phase spread spectrum signal and said frequency shifted quadrature spread spectrum signal, the outputs of said first and second multiplier means having components proportional to an in-phase part and quadrature part, respectively of the complex correlation of said received signal with said known delay time.

56. The matched filter of claim 55 wherein said approximating means includes a second down converter comprising:

reference means for generating a sinusoidal signal having a frequency equal to a harmonic of the chip rate of said received signal;

a reference hybrid with its input connected to the output of said reference means;

third multiplier means for providing a signal having an amplitude directly related to the product of the amplitudes of said in-phase part of the complex correlation of said received signal and a signal at the in-phase output of said reference hybrid;

fourth multiplier means for providing a signal having an amplitude directly related to the product of the amplitude of said quadrature part of the complex correlations of said received signal and a signal at the quadrature output of said reference hybrid;

fifth multiplier means for providing a signal having an amplitude directly related to the product of the amplitudes of said in-phase part of the complex correlation of said received signal and said signal at the quadrature output of said reference hybrid;

sixth multiplier means for providing a signal having an amplitude directly related to the product of the amplitude of said quadrature part of the complex correlation of said received signal and said signal at the in-phase output of said reference hybrid;

first adder means for providing a signal having an amplitude directly related to the sum of the amplitudes of the signals provided at the output of said third and fourth multiplier means;

second adder means for providing a signal having an amplitude directly related to the sum of the amplitudes of the signals provided at the outputs of fifth and sixth multiplier means;

first subtraction means for providing a signal directly having an amplitude directly related to the difference between the amplitudes of the signals provided at the outputs of said third and sixth multiplier means; and second subtractor means for providing a signal directly related to the difference between the amplitudes of the signals provided at the outputs of said fourth and fifth multiplier means.

57. The matched filter of claim 43 wherein the input of said simulation means is connected to the output of said estimating means, said simulation means providing a modified first spreading signal in accordance with a relationship which is given as:

$$Ao(t) = \hat{S}_{I1}(t) + \hat{S}_{Q1}(t)$$

where:

$Ao(t)$ is representative of the amplitude of the modified first spreading signal;

$\hat{S}_{I1}(t)$ is the amplitude of an estimated component of said received signal provided in response to the output of said first spread sequence generator, where the carat notation indicates distortion by the estimated medium transfer function;

$\hat{S}_{Q1}(t)$ is the amplitude of a component of said received signal provided in response to the output of said second spread sequence generator, where the carat notation indicates distortion by the estimated medium transfer function, said simulation means additionally provides a modified second spreading signal according to a relationship which is given as:

$$A_{90}(t) = \hat{S}_{I2}(t) + \hat{S}_{Q2}(t)$$

where:

$A_{90}(t)$ is representative of the amplitude of the modified second spreading signal;

$\hat{S}_{I2}(t)$ is the amplitude of an estimated component of said received signal provided in response to said first spread spectrum signal where the carat notation indicates distortion by the estimated medium transfer function; and $\hat{S}_{Q2}(t)$ is the amplitude of an estimated component of said received signal provided in response to said second spread spectrum signal where the carat notation indicates distortion by the estimated medium transfer function.

58. The matched filter of claim 43 wherein said recovery means comprises:

seventh multiplier means connected to said simulation means and said downconverting means for providing a signal having an amplitude directly related to the product of the amplitude of said modified first spreading signal and the amplitude of the output of an in-phase filter that provides a signal in accordance with a relationship which is given as:

$$M_{102OUT}(t) = \frac{d_I(t)\hat{S}_{I1}(t)}{2} - \frac{d_Q(t)\hat{S}_{Q2}(t)}{2}$$

where:

$M_{102OUT}(t)$ is the output of said in-phase filter; and eighth multiplier means connected to said simulation means and said downconverting means for providing a signal having an amplitude directly related to the products of the amplitude of said modified first spreading signal and the amplitude of the output of a quadrature filter that provides a signal in accordance with a relationship which is given as:

$$M_{104OUT}(t) = \frac{d_I(t)\hat{S}_{I2}(t)}{2} + \frac{d_Q(t)\hat{S}_{Q1}(t)}{2}$$

where:

$M_{104OUT}(t)$ is the output of said quadrature filter.

59. The matched filter of claim 58 wherein said recovery means additionally comprises:

ninth multiplier means connected to said simulation means and said downconverting means for providing a signal having an amplitude directly related to the product of the amplitude of said modified second spreading signal and the amplitude of the output of said in-phase filter; and tenth multiplier means connected to said simulation means and said downconverting means for providing a signal having an amplitude directly related to the product of the amplitude of said modified second spreading signal and the amplitude of said quadrature filter.

60. The matched filter of claim 59 wherein said recovery means additionally comprises adder means for providing a signal having an amplitude directly related to the sum of the amplitude of the signals provided by said seventh and tenth multiplier means.

61. The matched filter of claim 60 wherein said recovery means additionally comprises an integrate and dump circuit connected to said adder means.

62. The matched filter of claim 59 wherein said recovery means additionally comprises subtraction means for providing a signal having an amplitude directly related to the difference between the amplitudes of signals provided by said eighth and ninth multiplier means.

63. The matched filter of claim 62 wherein said recovery means additionally comprises an integrate and dump circuit connected to said subtraction means.

* * * * *

UNITED STATES PATENT AND TRADEMARK OFFICE
CERTIFICATE OF CORRECTION

PATENT NO. : 4,922,506

DATED : May 1, 1990

INVENTOR(S) : Ronald D. McCallister, et al.

Page 1 of 7

It is certified that error appears in the above—identified patent and that said Letters Patent is hereby corrected as shown below:

Column 4, lines 62-67 should read:

$$C_n(\tau_k) = \frac{e^{-jw_n\tau_s}}{2\pi T} \int_{-\infty}^{\infty} P(w) P^*(w-w_n) H(w) H^*(w-w_n) e^{j(w-w_n)\tau_k} dw$$

Column 5, line 4, delete "a", insert therefor --the $n^{th}$--.

Column 7, lines 41-44 should read:

$$H_m(w) = \sum_{i=1}^{i=N} \frac{\epsilon_{im}}{jw - \lambda_{im}}$$

Column 7, line 47, delete "$\epsilon im$", insert therefor --$\epsilon_{im}$--.

Column 7, line 49, delete "$\lambda im$", insert therefor --$\lambda_{im}$--.

Column 7, line 51, delete "$\epsilon i$ or $\lambda i$", insert therefor --$\epsilon_i$ or $\lambda_i$--.

UNITED STATES PATENT AND TRADEMARK OFFICE
CERTIFICATE OF CORRECTION

PATENT NO. : 4,922,506
DATED : May 1, 1990
INVENTOR(S) : Ronald D. McCallister, et al.

It is certified that error appears in the above—identified patent and that said Letters Patent is hereby corrected as shown below:

Column 7, lines 59-63 should read:

$$C_{(1)n}(\tau_k) = \frac{e^{-jw_n\tau_s}}{2\pi T} \int_{-\infty}^{\infty} P(w) P^*(w-w_n) H(w) H^*(w-w_n) e^{j(w-w_n)\tau_k} dw$$

Column 8, lines 5-6 should read:

$$E = \sum_m \sum_k |C_n(\tau_k) - C_{(1)n}(\tau_k)|^2$$

Column 9, lines 41-42 should read:

$\hat{a}_1(t)\cos(w_c t) = H_{II}(t) \circledast a(t)\cos(w_c t)$,

UNITED STATES PATENT AND TRADEMARK OFFICE
CERTIFICATE OF CORRECTION

PATENT NO. : 4,922,506
DATED : May 1, 1990
INVENTOR(S) : Ronald D. McCallister, et al.

It is certified that error appears in the above—identified patent and that said Letters Patent is hereby corrected as shown below:

Column 9, lines 46-47 should read:

* is the convolution operator $$(A(t) \oplus B(t)) = \int_{-\infty}^{\infty} A(y) B(t-y) \, dy$$

Column 9, line 51 should read:

$$\hat{a}_2(t)\sin(w_c t) = H_{IQ}(t) * a(t)\cos(w_c t),$$

Column 9, line 63 should read:

$$\hat{b}_1(t)\sin(w_c t) = H_{QQ}(t) * b(t)\sin(w_c t),$$

Column 10, line 6 should read:

$$-\hat{b}_2(t)\cos(w_c t) = H_{QI}(t) * b(t)\sin(w_c t),$$

UNITED STATES PATENT AND TRADEMARK OFFICE
CERTIFICATE OF CORRECTION

PATENT NO. : 4,922,506
DATED : May 1, 1990
INVENTOR(S) : Ronald D. McCallister, et al.

It is certified that error appears in the above-identified patent and that said Letters Patent is hereby corrected as shown below:

Column 12, lines 32-35 should read:

$$C_n(\tau_k) = e^{j\frac{(w_o\tau_k - w_n\tau_s)}{2\pi T}} \int_{-\infty}^{\infty} P(w) P^*(w-w_n) H(w) H^*(w-w_n) e^{j(w-w_n)\tau_k} dw$$

Column 16, lines 57-60 should read:

$$C_{(1)n}(\tau_k) = \frac{e^{-jw_n\tau_s}}{2\pi T} \int_{-\infty}^{\infty} P(w) P^*(w-w_n) H(w) H^*(w-w_n) e^{j(w-w_n)\tau_k} dw$$

Column 17, lines 11-13 should read:

$$H_m(w) = \sum_{i=1}^{i=N} \frac{e_{im}}{jw - \lambda_{im}}$$

Column 17, line 16, delete "ϵm", insert therefor --$\epsilon_m$--.

UNITED STATES PATENT AND TRADEMARK OFFICE
CERTIFICATE OF CORRECTION

PATENT NO. : 4,922,506
DATED : May 1, 1990
INVENTOR(S) : Ronald D. McCallister, et al.

It is certified that error appears in the above—identified patent and that said Letters Patent is hereby corrected as shown below:

Column 17, line 18, delete "$\lambda$im", insert therefor --$\lambda_{im}$--.

Column 17, line 20, delete "$\epsilon$i or $\lambda$i", insert therefor --$\epsilon_i$ or $\lambda_i$--.

Column 18, lines 38-42 should read:

$$C_{(1)n}(\tau_k) = \frac{e^{-jw_n\tau_s}}{2\pi T} \int_{-\infty}^{\infty} P(w) P^*(w-w_n) H(w) H^*(w-w_n) e^{j(w-w_n)\tau_k} dw$$

Column 18, lines 60-62 should read:

$$H_m(w) = \sum_{i=1}^{i=N} \frac{e_{im}}{jw-\lambda_{im}}$$

Column 18, line 65, delete "$\epsilon$m", insert therefor --$\epsilon_m$--.

Column 18, line 67, delete "$\lambda$im", insert therefor --$\lambda_{im}$--.

Column 19, line 1, delete "$\epsilon$i or $\lambda$i", insert therefor --$\epsilon_i$ or $\lambda_i$--.

UNITED STATES PATENT AND TRADEMARK OFFICE
CERTIFICATE OF CORRECTION

PATENT NO. : 4,922,506
DATED : May 1, 1990
INVENTOR(S) : Ronald D. McCallister, et al.

It is certified that error appears in the above—identified patent and that said Letters Patent is hereby corrected as shown below:

Column 20, lines 48-51 should read:

$$C_{(1)n}(\tau_k) = \frac{e^{-jw_n\tau_s}}{2\pi T} \int_{-\infty}^{\infty} P(w) P^*(w-w_n) H(w) H^*(w-w_n) e^{j(w-w_n)\tau_k} dw$$

Column 21, lines 1-4 should read:

$$H_m(w) = \sum_{i=1}^{i=N} \frac{e_{im}}{jw - \lambda_{im}}$$

Column 21, line 7, delete "εim", insert therefor --$\epsilon_{im}$--.

Column 21, line 9, delete "λim", insert therefor --$\lambda_{im}$--.

Column 21, line 11, delete "εi or λi", insert therefor --$\epsilon_i$ or $\lambda_i$--.

UNITED STATES PATENT AND TRADEMARK OFFICE
CERTIFICATE OF CORRECTION

PATENT NO. : 4,922,506
DATED : May 1, 1990
INVENTOR(S) : Ronald D. McCallister, et al.

It is certified that error appears in the above—identified patent and that said Letters Patent is hereby corrected as shown below:

Column 24, lines 19-22 should read:

$$C_n(\tau_k) = e^{j\frac{(w_o\tau_k - w_n\tau_s)}{2\pi T}} \int_{-\infty}^{\infty} P(w) P^*(w-w_n) H(w) H^*(w-w_n) e^{j(w-w_n)\tau_k} dw$$

Signed and Sealed this

Ninth Day of June, 1992

Attest:

DOUGLAS B. COMER

Attesting Officer

Acting Commissioner of Patents and Trademarks